US006621793B2

(12) United States Patent
Widegren et al.

(10) Patent No.: US 6,621,793 B2
(45) Date of Patent: Sep. 16, 2003

(54) APPLICATION INFLUENCED POLICY

(75) Inventors: Ina Widegren, Stockholm (SE); Gabor Fodor, Hasselby (SE); Brian Williams, Melbourne (AU); Johnson Oyama, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 09/861,817

(22) Filed: May 21, 2001

(65) Prior Publication Data

US 2002/0036983 A1 Mar. 28, 2002

Related U.S. Application Data

(60) Provisional application No. 60/246,501, filed on Nov. 6, 2000, and provisional application No. 60/206,186, filed on May 22, 2000.

(51) Int. Cl.[7] .............................................. G01R 31/08
(52) U.S. Cl. ..................... 370/230.1; 370/352; 370/401
(58) Field of Search ...................... 370/230.1, 351–352, 370/401–413, 389–396, 428, 252, 236; 713/1–201, 202; 709/223, 224; 379/219, 202, 220–229, 391, 230

(56) References Cited

U.S. PATENT DOCUMENTS 6,539,026 B1 * 3/1999 Waclawsky ................. 370/428
6,141,686 A * 10/2000 Jackowski et al. .......... 709/224
6,366,577 B1 * 4/2002 Donovan .................... 370/352
6,473,851 B1 * 10/2002 Plutowski ....................... 713/1
6,483,912 B1 * 11/2002 Kalmanek, Jr. et al. ..... 379/219
6,505,244 B1 * 1/2003 Natarajan et al. ........... 709/223

FOREIGN PATENT DOCUMENTS

EP          0 790 751 A     8/1997
WO       WO 99 52307 A    10/1999

OTHER PUBLICATIONS

Tajima, K. et al, "A resource management architecture over differentiated services domains for guarantee of bandwidth, delay and jitter", EUROCOMM 200, Information Systems For Enhanced Public Safety and Security, IEEE/AFCEA, May 17, 2000, pp. 242–249.

Roberts, E., "IP tools; IP highway's policy server centralizes quality–of–service administration on RSVP networks", Data Communications, vol. 27, No. 1, 1998, pp. 30–32.

* cited by examiner

Primary Examiner—Kwang Bin Yao
Assistant Examiner—Prenell Jones

(57) ABSTRACT

A method of filtering and gating data flow in a QoS connection between a remote host and user equipment in a packet data network using policy control mechanisms includes a remote host initiating an application in an application server and a corresponding session between the remote host and the user equipment ("UE") via the application server. The UE requests, to a gateway support node ("GGSN") of the network, establishment of a network bearer service between the UE and the remote host. A corresponding policy control function ("PCF") in a policy server receives, from the application server, filtering data derived from session data received by the application server during the session. The GGSN interrogates the corresponding PCF in the policy server to initialize a gate using policy control filtering data at the GGSN. The gate then filters the data flow in the QoS connection according to the policy control filtering data.

41 Claims, 17 Drawing Sheets

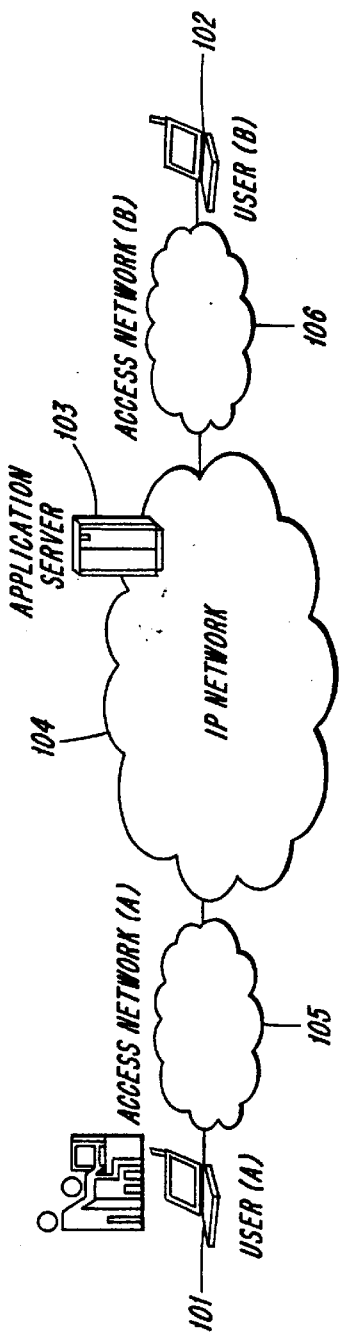
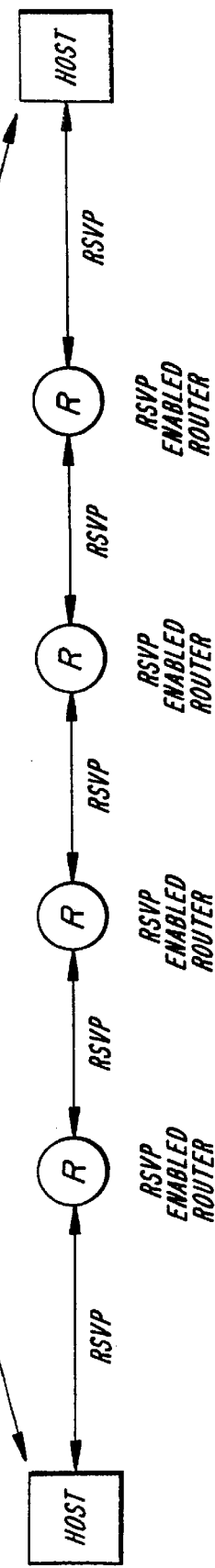
Fig. 1 PRIOR ART
Fig. 2 PRIOR ART

| TRAFFIC CLASS | CONVERSATIONAL CLASS CONVERSATIONAL RT | STREAMING CLASS STREAMING RT | INTERACTIVE CLASS INTERACTIVE BEST EFFORT | BACKGROUND BACKGROUND BEST EFFORT |
|---|---|---|---|---|
| FUNDAMENTAL CHARACTERISTICS | • PRESERVE TIME RELATION (VARIATION) BETWEEN INFORMATION ENTITIES OF THE STREAM<br>• CONVERSATIONAL PATTERN (STRINGENT AND LOW DELAY) | • PRESERVE TIME RELATION (VARIATION) BETWEEN INFORMATION ENTITIES OF THE STREAM | • REQUEST RESPONSE PATTERN<br>• PRESERVE PAYLOAD CONTENT | • DESTINATION IS NOT EXPECTING THE DATA WITHIN A CERTAIN TIME<br>• PRESERVE PAYLOAD CONTENT |
| EXAMPLE OF THE APPLICATION | – VOICE | – STREAMING VIDEO | – WEB BROWSING | – BACKGROUND DOWNLOAD OF EMAILS |

Fig. 10
PRIOR ART

| TRAFFIC CLASS | CONVERSATIONAL | STREAMING | INTERACTIVE | BACKGROUND |
|---|---|---|---|---|
| MAXIMUM BIT RATE | x | x | x | x |
| GUARANTEED BIT RATE | x | x | | |
| DELIVERY ORDER | x | x | x | x |
| MAXIMUM SDU SIZE | x | x | x | x |
| SDU FORMAT INFO *) | x | x | | |
| SDU LOSS RATIO | x | x | x | x |
| RESIDUAL BIT ERROR RATIO | x | x | x | x |
| DELIVERY OF ERRONEOUS SDUS | x | x | x | x |
| TRANSFER DELAY | x | x | | |
| TRAFFIC HANDLING PRIO | | | x | |
| ALLOCATION/RETENTION PRIORITY | x | x | x | x |
| SOURCE STATISTICS DESCRIPTOR *) | x | x | | |

Fig. 11
PRIOR ART

*) PARAMETER DIFFERS DEPENDING ON IF IT IS A UMTS BS DESCRIPTION OR A RAB SERVICE DESCRIPTION

| | |
|---|---|
| TRAFFIC CLASS | THE TRAFFIC CLASS LABEL CONTAINS A LOT OF INFORMATION ITSELF |
| MAXIMUM BIT RATE | USED FOR DOWNLINK CODE RESERVATION, POLICING AND SHAPING TOWARDS EXTERNAL NETWORKS |
| GUARANTEED BIT RATE | USED FOR ADMISSION CONTROL AND RESOURCE RESERVATION |
| DELIVERY ORDER | USED TO SETTLE WHETHER PDUs HAVE TO BE BUFFERED AND REORDERED IN ORDER TO BE IN SEQUENCE AT THE OUTPUT OF THE SYSTEM |
| MAXIMUM SDU SIZE | USED FOR ADMISSION CONTROL AND POLICING |
| SDU FORMAT INFO *) | RLC CONFIGURATION. IF INFORMATION OF ALL POSSIBLE SDU SIZES IS GIVEN, THEN RLC CAN BE TRANSPARENT (IN CASE NO ARQ IS NEEDED). |
| SDU LOSS RATIO | USED FOR ARQ CONFIGURATION, ERROR DETECTION CONFIGURATION ON L1 (CRC) |
| RESIDUAL BIT ERROR RATIO | CHOICE OF CHANNEL CODING, ERROR DETECTION ON L1 |
| DELIVERY OF ERRONEOUS SDUs | IS THE NW ALLOWED TO DISCARD PACKETS IN CASE OF ERRONEOUS CHECKSUM? |
| TRANSFER DELAY | THE DELAY IS USED TO DETERMINE WHETHER ARQ SHALL/CAN BE USED OR NOT. ALSO USED FOR TRANSPORT FORMAT SETTINGS. |
| TRAFFIC HANDLING PRIORITY | FOR DIFFERENTIATE INTERACTIVE SERVICE CLASS FOR SCHEDULING PURPOSES |
| ALLOCATION/RETENTION PRIORITY | USED FOR ADMISSION CONTROL AND SETTLEMENT IN CASE OF CONGESTION, I.E. WHO TO ADMIT AND WHO TO DISCARD. |
| SOURCE STATISTICS DESCRIPTOR *) | THIS INFORMATION THAT GIVES THE POSSIBILITY TO USE STATISTICS AT ADMISSION CONTROL, E.G. SPEECH AND DTX. |

*) PARAMETER DIFFERS DEPENDING ON IF IT IS A UMTS BS DESCRIPTION OR A RAB SERVICE DESCRIPTION

Fig. 12
PRIOR ART

| PACKET FILTER ATTRIBUTE | VALID COMBINATION TYPES | | |
| --- | --- | --- | --- |
| | I | II | III |
| SOURCE ADDRESS AND SUBNET MASK | X | X | X |
| PROTOCOL NUMBER (IPv4)/NEXT HEADER (IPv6) | X | X | |
| DESTINATION PORT RANGE | X | | |
| SOURCE PORT RANGE | X | | |
| IPSEC SECURITY PARAMETER INDEX | | X | |
| TOS (IPv4)/TRAFFIC CLASS (IPv6) AND MASK | X | X | X |
| FLOW LABEL (IPv6) | | | X |

*Fig. 14*
PRIOR ART

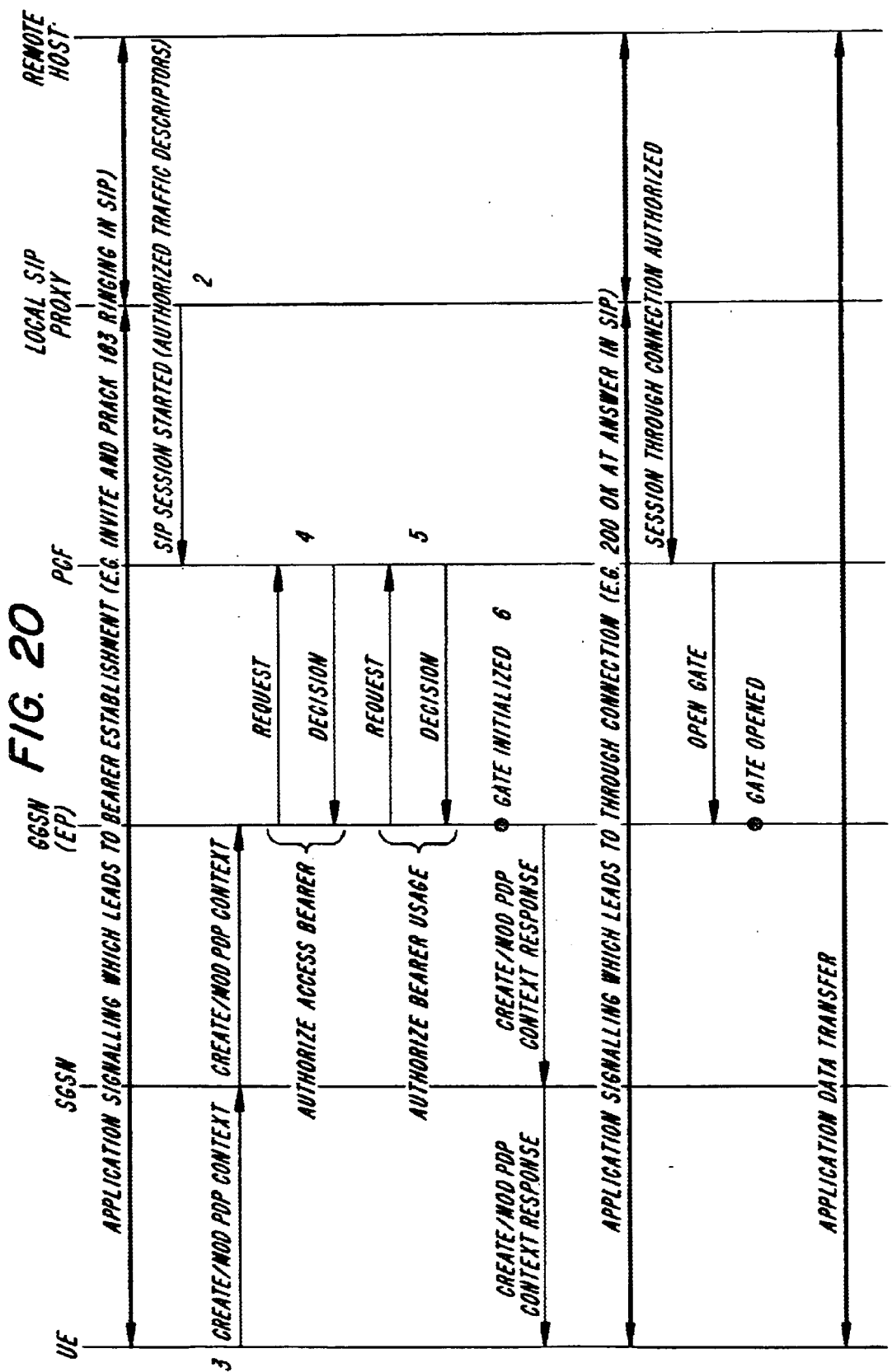

APPLICATION INFLUENCED POLICY

CROSS-REFERENCE TO RELATED APPLICATIONS

This application is related to, and claims priority from, U.S. Provisional Applications Ser. No. 60/206,186 entitled "All IP Policy Architecture" filed on May 22, 2000, and Ser. No. 60/246,501 entitled "Enable User Choice in a System Using Application Influenced Policy" filed on Nov. 6, 2000, the disclosures of which are incorporated herein by reference.

BACKGROUND

This application generally relates to packet data networks, and more specifically to filtering and gating data in packet data networks using policy mechanisms.

Originally, packet data networks, such as Internet Protocol ("IP") networks, were designed to carry "best effort" traffic. That is, the network did not guarantee that a user packet would arrive at the destination. Because of the market success of IP networks, there is today a clear requirement for mechanisms that allow IP networks to support various types of applications. Some of these applications have quality-of-service ("QoS") requirements. Examples of such applications include various real time applications (IP Telephony, video conferencing), streaming services (audio or video), or high quality data services (browsing with bounded download delays). Recognizing these requirements, the Internet Engineering Task Force ("IETF"), which is the main standards body for IP networking, recently standardized a set of protocols and mechanisms that enable IP network operators to build QoS-enabled IP networks.

FIG. 1 depicts a simplified high-level model of an IP network which may be useful in explaining QoS provisioning. As can be appreciated, the model includes two users, but could easily be expanded to include more users without changing the basic functionality of the network.

In FIG. 1, User-A 101 may communicate with User-B 102 or with an application server 103. For example, in the case of an IP telephony session, User-A 101 may communicate with User-B 102. Similarly, in the case of streaming services, User-A 101 may communicate with the application server 103, which may be configured as a video server. In either case, User-A 101 accesses an IP backbone network 104 through a local access network 105, such as a telephone, Global System for Mobile Communications ("GSM"), or Universal Mobile Telecommunication System ("UMTS") network. User-B 102 is similarly connected to the IP network 104 through local access network 106. It will be appreciated that User-A and User-B need not use the same type of access network, however.

As is generally known, the IP network 104 may include a number of IP routers and interconnecting links that together provide connectivity between the IP network's ingress and egress points and thereby make two party communication possible.

As far as the users are concerned, the perceived QoS depends on the mechanisms both in the access networks 105, 106 and on the IP backbone network 104. Of particular interest is the specific case where at least one of the access networks is a UMTS network.

When users access IP based services, they typically use a device that runs an application program that provides the interface for the user to access the particular service. For instance, in FIG. 1, User-A may use a laptop computer running a conferencing application program to attend an IP network based meeting, where participants of the meeting collaborate using various programs. Such programs are well known in the art.

Various applications may access network services through an application programming interface ("API"). An API provides application programmers with a uniform interface to access underlying system resources. For instance, an API may be used to configure the network resource manager to require that a particular IP packet originating from a given application receive a certain treatment from the network, such as a particular QoS. For example, if the IP network is a Differentiated Services IP network, then an application program may request that all of its IP packets receive the "Expedited Forwarding" treatment.

Note that the User (and the API in the user's equipment) may not be aware of the different technologies that various access networks and IP backbone networks employ in order to provide end-to-end QoS. For instance, the user may use an RSVP/IntServ based API and the end-to-end embodiment in which the user is involved may include a UMTS access network and a non-RSVP enabled IP network. In such cases, some interworking mechanisms between the various technologies may be needed to make sure that QoS is provided end-to-end.

Integrated Services ("IntServ") provide the ability for applications to choose among multiple, controlled levels of delivery service for their data packets. To support this capability, two things are required. First, individual network elements, such as subnets and IP routers, along the path followed by an application's data packets must support mechanisms to control the QoS delivered to those packets. Second, a way to communicate the application's requirements to network elements along the path and to convey QoS management information between network elements and the application must be provided.

IntServ defines a number of services such as Controlled-Load (defined in IETF RFC 2211) and Guaranteed (defined in IETF RFC 2212). The service definition defines the required characteristics of the network equipment in order to deliver the service. For example, guaranteed service provides firm, mathematically-provable bounds on end-to-end datagram queuing delays and makes it possible to provide a service that guarantees both delay and bandwidth. Controlled-load service provides the client data flow with a QoS closely approximating the QoS that the same flow would receive from an unloaded network element, but uses capacity (admission) control to assure that this service is received even when the network element is overloaded. The individual network elements (subnets and IP routers) that support the service must comply with the definitions defined for the service.

The service definition also defines the information that must be provided across the network in order to establish the service. This function may be provided in a number of ways, but is frequently implemented by a resource reservation setup protocol such as RSVP (defined in IETF RFC 2205).

RSVP (Resource reSerVation Protocol) is a resource reservation setup protocol designed for an IntServ Internet (defined in IETF RFC 1633, 2205, and 2210). The RSVP protocol is used by a host to request specific qualities of service from the network for particular application data streams or flows. RSVP is also used by routers to deliver QoS requests to all nodes along the path(s) of the flows and to establish and maintain state to provide the requested service. RSVP requests will generally result in resources being reserved in each node along the data path.

FIG. 2 shows the End-to-End Integrated Service between the hosts. The service is provided using routers and hosts that support the service definition defined for the required service and through signaling of the relevant information between the nodes.

Since RSVP is a protocol that is primarily designed to be end-to-end, some extra functionality is required in a situation where the sender would like to use RSVP for resource reservation in only some portion of the end-to-end path. This may arise if RSVP is used in an access network and over-provisioning is used in the backbone network. In such situations the concept of the RSVP Proxy is useful.

The RSVP Proxy is a functionality provided by a network device, such as a router or a switch, in which the network device originates the RESV message in response to an incoming PATH message on behalf of one or more receivers identified by the PATH message. In other words, the RSVP Proxy acts on behalf of the remote host and thereby facilitates resource reservation between the originating host and the RSVP Proxy. This is shown in FIG. 3. The RSVP Proxy may use knowledge of network conditions between the RSVP Proxy and the non-RSVP host.

Differentiated Services ("DiffServ") enhancements to the Internet protocol are intended to enable scalable service discrimination in the Internet without the need for per-flow state and signaling at every hop. A variety of services may be built from a small, well-defined set of building blocks which are deployed in network nodes. The services may be either end-to-end or intra-domain; the services include those that can satisfy quantitative performance requirements (e.g., peak bandwidth) and those based on relative performance (e.g., "class" differentiation). Services may be constructed by a combination of setting bits in an IP header field at network boundaries (autonomous system boundaries, internal administrative boundaries, or hosts), using those bits to determine how packets are forwarded by the nodes inside the network, and conditioning the marked packets at network boundaries in accordance with the requirements or rules of each service.

Differentiated Services defines an edge router at the network boundary, and core routers within the network. The edge and core routers have different duties. The edge router must condition the traffic to ensure that the traffic conforms to the service agreement. The edge router also marks the packet traffic with the appropriate Differentiated Services Code Point ("DSCP") and then forwards the packets according to the service behavior defined for that DSCP. The service behavior, called the Per Hop Behavior ("PHB") may define the prioritization or weighting of that type of traffic to give the traffic better service than other traffic of a different type. The core nodes examine the DSCP and apply the service behavior appropriate for that service.

FIG. 4 shows the end-to-end service. The DS edge routers perform the traffic conditioning, while the DS core routers simply apply the PHB.

The IntServ architecture provides a means for the delivery of end-to-end QoS to applications over heterogeneous networks. To support this end-to-end model, the IntServ architecture must be supported over a wide variety of different types of network elements. In this context, a network that supports Differentiated Services may be viewed as a network element in the total end-to-end path.

From the perspective of IntServ, DiffServ regions of the network are treated as virtual links connecting IntServ capable routers or hosts (much as an ethernet LAN can be treated as a virtual link). Within the DiffServ regions of the network, routers implement specific PHBs (aggregate traffic control). The total amount of traffic that is admitted into the DiffServ region that will receive a certain PHB is controlled by the conditioning at the edge routers. An IntServ service can be provided across a DiffServ domain by applying admission control and traffic conditioning at the edge router, and signaling using RSVP across the DiffServ domain. The information provided in the RSVP signaling should be appropriate for the service across the DiffServ domain. This is shown in FIG. 5.

To realize a QoS Bearer Service with clearly defined characteristics and functionality, the bearer must be set up from the source to the destination of the service. A bearer service includes all aspects to enable the provision of a contracted QoS. These aspects are among others the control signaling, user plane transport, and QoS management functionality.

Mobile Access Data Networks, including General Packet Radio Service ("GPRS") and UMTS, may form a part of the overall network and play an important role in the end-to-end bearer service for customers connected to it. Hence, the service provided over the GPRS/UMTS network must be suitable in the aspects mentioned above of control signaling and user plane transport to provide the required end-to-end bearer service.

The GPRS/UMTS network includes a set of network elements between the host, such as a Mobile Station ("MS"), for example, and the external packet switching network the user is connecting to. The host may also be one of several network communication devices, such as a computer, personal data assistant ("PDA"), etc. A MS host is shown in FIG. 6 for illustrative purposes.

The Gateway GPRS Support Node ("GGSN") provides the interworking with external packet-switched networks.

In order to send and receive packet-switched ("PS") data, the MS shall activate the Packet Data Protocol context that the MS wants to use. This operation makes the MS known in the corresponding GGSN and interworking with external data networks can commence.

User data is transferred transparently between the MS and the external data networks with a method known as encapsulation and tunneling: data packets are equipped with PS-specific protocol information and transferred between the MS and the GGSN.

QoS has an extremely important and central role in Third Generation ("3G") mobile networks as well. QoS is a means for providing end users with satisfying service and also is essential for network management in terms of knowledge. QoS implies knowledge of the traffic in the network and thus QoS also enables efficient use of the spectrum resources.

The invention will be described in terms of a UMTS QoS architecture. Accordingly, in order to provide a uniform level of understanding, a state-of-the-art overview of QoS in UMTS is provided. The Third Generation Partnership Project ("3GPP") UMTS QoS architecture is described, including an explanation of the Packet Data Protocol ("PDP") context, the traffic flow template ("TFT"), and the QoS maintenance procedures for activated UMTS bearers.

It is expected that bandwidth associated with radio is the most expensive and precious resource in the end-to-end chain. Within UMTS access networks, the radio network resources are managed on a per PDP context granularity, which corresponds to a user flow and a certain QoS level.

The QoS framework for R99 3G networks is specified in TS23.107 V.3.4.0. The main focus is on the QoS architecture to be used in the UMTS level, where the list of QoS attributes applicable to UMTS Bearer Service and the Radio Access Bearer Service are specified along with appropriate mapping rules.

TS23.060 V.3.4.0 specifies the general mechanisms used by R99 3G networks for PS connectivity services in the UMTS level. This defines the service description for the packet domain of the 3G network, which includes the GPRS in GSM and UMTS.

In a UMTS QoS Architecture, network services are considered end-to-end, from a Terminal Equipment ("TE") to another TE. An End-to-End Service may have a certain QoS, which is provided to the user of a network service.

To realize a certain network QoS, a Bearer Service with clearly defined characteristics and functionality is set up from the source to the destination of a service. The bearer service includes all aspects to enable the provision of a contracted QoS, e.g., control signaling, user plane transport, QoS management functionality, etc.

A UMTS bearer service layered architecture is depicted in FIG. 7. Each bearer service on a specific layer offers its individual services using services provided by the layers below. Bearers are broken down into underlying bearers, each one providing a QoS by a realization that is independent of the other bearers. Service agreements are made between network components, which are arranged vertically in FIG. 7. The service agreements may be executed by one or more layers of service.

For instance, the UMTS bearer service includes a Radio Access Bearer ("RAB") service and a Core Network ("CN") bearer service. The RAB service is then divided into a radio bearer service and a Iu bearer service. The Iu interface is the interface between the radio access network and the core network.

The following are examples of the entities shown in FIG. 7. The terminal equipment ("TE") may be a laptop computer and the mobile terminal ("MT") may be a handset, e.g., a mobile station. The UMTS Terrestrial Radio Access Network ("UTRAN") may be made up of a combination of Node B and a Radio Network Controller ("RNC"). The CN Iu Edge Node may be a Serving GPRS Support Node ("SGSN") and the CN Gateway ("GW") may be a GGSN.

The QoS management functions in UMTS are used to establish, modify and maintain a UMTS Bearer Service with a specific QoS, as defined by specific QoS attributes. The QoS management functions of all UMTS entities combined ensure the provision of the negotiated UMTS bearer service.

The UMTS architecture comprises four management functions in the control plane and four in the user plane. The control plane management functions are:

Bearer Service ("BS") Manager, which sets up, controls, and terminates the corresponding bearer service. Each BS manager also translates the attributes of its level to attributes of the underlying bearer service during service requests.

Translation function, which converts between external service signaling and internal service primitives including the translation of the service attributes, and is located in the MT and in the GW.

Admission/Capability control, which determines whether the network entity supports the specific requested service, and whether the required resources are available.

Subscription Control, which determines whether the user has the subscription for the bearer being requested.

The user plane management functions are:

Mapping function, which marks each data unit with the specific QoS indication related to the bearer service performing the transfer of the data unit. For example, the mapping function may add DiffServ code points to packets before putting the packets on the Iu or CN bearer.

Classification function, which resides in the GGSN and in the MT, assigns user data units (e.g., IP packets) received from the external bearer service (or the local bearer service) to the appropriate UMTS bearer service according to the QoS requirements of each user data unit. This is where the traffic flow template ("TFT") and packet filters are situated, as described below.

Resource Manager, which distributes its resources between all bearer services that are requesting use of these resources. The resource manager attempts to provide the QoS attributes required for each individual bearer service. An example of resource manager is a packet scheduler.

Traffic conditioner, which is a shaping and policing function which provides conformance of the user data traffic with the QoS attributes of the concerned UMTS bearer service. Traffic conditioner resides in the GGSN and in the MT as well as in the UTRAN.

The QoS management functions for controlling the UMTS bearer service are shown in FIG. 8. The purpose of these control functions is to support establishment and modification of UMTS bearer services through interaction with the Local Service Control in the TE, and the External Service Control in the External Network.

The QoS management functions of the UMTS bearer service in the user plane are shown in FIG. 9. These functions together maintain the data transfer characteristics according to the commitments established by the UMTS bearer service control functions, expressed by the bearer service attributes. The user plane uses the QoS attributes. The relevant attributes are provided to the user plane management functions by the QoS management control functions.

Four different QoS classes are standardized in UMTS and are shown in FIG. 10. Data transport may be optimized for the corresponding type of application data or for a bearer service of a certain class. The main distinguishing factor between these classes is how delay sensitive the traffic is: Conversational class is meant for traffic which is very delay sensitive (for real-time services) while Background class is the most delay insensitive traffic class (for non-real time services).

To characterize a bearer service in detail, a set of bearer service attributes are standardized in UMTS as shown in the tables below. A certain QoS is requested by selecting a set of attribute values that describes the bearer requirement. Parameters differ depending on the type of bearer service requested.

FIG. 11 shows which attributes that are applicable to which traffic class. FIG. 12 provides an overview of what the different QoS attributes are used for. The exact definitions of the QoS attributes can be found in TS23.107, which is currently at version 3.4.0.

A subscription is associated with one or more PDP addresses, i.e. IP addresses in the case of IP traffic. Each PDP address is described by one or more PDP contexts stored in the MS, the SGSN, and the GGSN. Default values are also available in the HLR which holds the subscription information. Each PDP context may be associated with a Traffic Flow Template ("TFT"). At most one PDP context (associated with the same PDP address) may exist at any time with no TFT assigned to it. The relationship between PDP address, PDP context, and TFT is provided in FIG. 13.

A PDP context is a dynamic table of data entries, comprising all needed information for transferring PDP PDUs between MS and GGSN, for example addressing information, flow control variables, QoS profile, charging information, etc. The relation between UMTS bearer services and PDP context is a one to one mapping, i.e. if two UMTS bearer services are established for one PDP address, two PDP contexts are defined.

The PDP context procedures are standardized in TS23.060, which is currently at version 3.4.0. The concepts surrounding the QoS profile and the Traffic Flow Template ("TFT") are relevant from the QoS perspective.

The UMTS QoS attributes have been selected and defined mainly for supporting efficient radio realization. A QoS profile is defined by a set of UMTS QoS attributes. The RNC obtains the pertinent RAB QoS profile from the SGSN during PDP context activation. There are three different QoS profiles involved in a PDP context activation—the requested QoS profile, the negotiated QoS profile, and the subscribed QoS profile (or the default QoS profile).

Depending on the type of information needed, the stored PDP context information differ in the MS, RNC, SGSN, GGSN, and HLR, as listed in Table 1.

TABLE 1

| | |
|---|---|
| GGSN | Negotiated QoS profile |
| MS | Negotiated QoS profile, Requested QoS profile, and Subscribed QoS profile |
| SGSN | Negotiated QoS profile, Requested QoS profile and Subscribed QoS profile |
| RNC | Negotiated RAB QoS profile |
| HLR | Subscribed QoS profile |

A TFT is a packet filter (or set of filters) that associates packets to the correct PDP context, ensuring that packets are forwarded in the appropriate GPRS Tunneling Protocol ("GTP") tunnel. The TFT enables the possibility of having several PDP contexts with varying QoS profiles, associated to a single PDP address. The TFT is managed and initiated by the MT both for the uplink and downlink flows. The uplink TFT resides in the MT, while the downlink TFT resides in the GGSN. The downlink TFT is sent from the MT to the GGSN during PDP context activation/modification. The downlink TFT's may be added to a PDP context that was created without one, and the contents may be modified as well.

FIG. 14 shows the TFT packet filter attributes and valid combinations. Each TFT has an identifier and an evaluation precedence index that is unique within all TFT's associated with the PDP contexts that share the same PDP address. The MS manages the identifiers and the evaluation precedence indexes of the TFT's, and as well as the packet filter contents.

Some of the attributes in FIG. 14 may coexist in a packet filter while others mutually exclude each other. Only those attributes marked with an "X" may be specified for a single packet filter. All marked attributes may be specified, but at least one has to be specified.

The PDP context signaling is the means for carrying the requested and negotiated QoS profile between the nodes in the UMTS network. PDP context signaling has a central role for QoS handling in terms of admission control, negotiation, and modifying of bearers on a QoS level. The PDP context signaling message exchanges are described below with reference to the numerals in FIG. 15.

In step 1, an RRC connection is established. This procedure is needed to establish a connection between the MS and the UTRAN. However, from a QoS perspective, the establishment phase typically does little more than indicating the type of radio channel that is being used.

In step 2, the MS sends a PDP message to the SGSN to activate the PDP context. The requested QoS profile is included in this message. At this stage, the SGSN makes an admission check and might restrict the requested QoS if the system is overloaded.

In step 3, the SGSN sends a RANAP message, "RAB Assignment Request", to the RNC. RANAP, or radio access network application part, is an application protocol for supporting signaling and control transmission between the Radio Access Network ("RAN") and the external CN. RANAP permits communication between the RAN and circuit-switched or packet-switched networks. This request to establish a radio access bearer service carries the RAB QoS attributes, which may have been modified by the SGSN.

In step 4, the RNC uses the RAB QoS attributes to determine the radio related parameter corresponding to the QoS profile. These parameters may include transport format set and transport format combination set. In addition, the UTRAN performs an admission control on this bearer.

In step 5, the RNC sends an RRC message, "Radio Bearer Set-up," to the MS. The RRC message includes the radio related parameters that were determined in step 4.

In step 6, the UTRAN and the MS apply the radio parameters and are ready to transfer traffic. To signal this, the MS sends a "Radio Bearer Set-up Complete" RRC message to the RNC.

In step 7, the UTRAN sends a "RAB Assignment Complete" RANAP message to the SGSN.

In step 8, a Trace procedure may be initiated. This is an operation and maintenance function for surveying subscribers.

In step 9, the SGSN sends a "Create PDP Context Request" to the GGSN, carrying the QoS profile. However, the QoS profile may have different parameters than those requested by the MS in step 2. Based on this profile, an admission control is performed at the GGSN level and the GGSN may restrict the QoS if, for example, the system is overloaded. The GGSN stores the PDP context in its database.

In step 10, the GGSN returns the negotiated QoS to the SGSN in a "Create PDP Context Response" message and the SGSN stores the PDP context in its database.

In step 11, the negotiated QoS is sent from the SGSN to the MS in a "Activate PDP Context Accept" message. If either the SGSN or the GGSN has modified the QoS profile, then the MS has to either accept or reject this profile.

There are several local admission controls taking place in the procedure. However, since bandwidth associated with radio is the most expensive resource, the UTRAN is consulted in determining whether radio resources are available or not during PDP context activation or modification. Thus, admission control in UMTS is performed in a radio centric manner.

To provide IP QoS end-to-end, it is necessary to manage the QoS within each domain. An IP BS Manager in the Gateway is used to control the external IP bearer service. Due to the different techniques used within the IP network, this communicates to the UMTS BS manager through the Translation function.

There is a likewise a need for an IP bearer service manager function to be provided in UE, where the bearer service manager maps the QoS requirements of the application to the appropriate QoS mechanisms.

FIG. 16 shows the embodiment for control of an IP service using IP BS Managers in both possible locations in the UE and Gateway node. FIG. 16 also indicates the optional communication path between the IP BS Managers in the UE and the Gateway node.

The IP BS Managers use standard IP mechanisms to manage the IP bearer service. These mechanisms may be different from mechanisms used within the UMTS, and may have different parameters controlling the service. The translation/mapping function provides the interworking between the mechanisms and parameters used within the UMTS bearer service and those used within the IP bearer service, and interacts with the IP BS Manager.

If an IP BS Manager exists both in the UE and the Gateway node, it is possible that these IP BS Managers communicate directly with each other by using relevant signaling protocols.

An IP Multimedia service ("IMS") is defined on top of GPRS bearer service. The IP Multimedia service provides multimedia sessions to the user. QoS aspects of bearers supporting IP multimedia is specified in TS 23.207 and the IP Multimedia ("IM") specification is in TS 23.228.

The IMS is based on IP application signaling, such as, for example, Session Initiation Protocol ("SIP/SDP"). An end-user requests a session on a signaling GPRS bearer, which must be established prior to the session setup. FIG. 17 illustrates the interrelation of an IP Multimedia system to GPRS bearers. GPRS bearers are established between terminal A or B 1700, 1750 and a respective gateway 1720, 1770 between a UMTS network 1710, 1760 and the backbone 1740. The gateway also serves as an aggregation pont for the traffic from several GPRS users.

One GPRS bearer carries the application level signaling 1780 (such as SIP/SDP) that will be exchanged with the remote terminals 1700, 1750 to setup an IM session. The application is supported by one or several proxies in the network. To carry the actual media streams, one GPRS bearer is then established up to the aggregation point 1720, 1770 for each media stream. When resources are available end-to-end, by dedicated GPRS bearers and by access to the shared aggregated transport through the backbone, the multimedia session is connected and may start. Thus a number of parallel GPRS bearers are established to support a multimedia session.

Generally speaking, QoS protocols provide the mechanisms to reserve necessary network resources and to differentiate the traffic, while policy rules define how they are used. For instance, the IETF QoS mechanisms RSVP and IntServ define a resource reservation setup protocol and a set of service definitions, respectively. However, the admission control mechanism of IntServ does not include an important aspect of admission control. More particularly, network managers and service providers must be able to monitor, control and enforce the use of network resources and services based on policies derived from criteria, such as: the identity/authority level of users and applications (e.g. managers, engineers, trainees, etc.); traffic bandwidth requirements (e.g. narrow band, wide-band, etc.); security considerations (e.g. access to mission critical resources); and time-of-day/week.

Since there are varying circumstances in which traffic owners, end-users, applications, Internet hosts, etc., are entitled to the services they request, there is a need for rules, a need for enforcement methods of these rules and a need for a "judge" to decide when they apply. Consequently, the three major components of a policy system is the policy rules and their storage (typically in a policy database), the enforcement methods using policy enforcement points ("EP"), and the policy decision points ("DP"). Additionally, the IETF has standardized a protocol for information exchange between EP's and DP's under the term Common Open Policy Service ("COPS").

A policy may be regarded as a collection of rules that result in one or more actions when specific conditions exist. The IETF Policy Framework is illustrated in FIG. 18. The separation between EP and DP, and also DP and the Policy Repository, is a logical one based on functionality and open interfaces, and not necessarily a physical separation. Also, there are typically multiple EP's in a network domain, with multiple interfaces on each EP possible as well. For instance, all or some routers of an administrative domain may implement the EP functionality in an IP network, and a central server may implement the DP functionality in that domain. The DP in turn may be connected to a Policy (Rule) Repository and fetch data from it in order to make policy decisions. The Lightweight Directory Access Protocol ("LDAP"), for example, may be used as the protocol between the DP and the Policy Repository. The DP may communicate and export policy information to other network components, such as a network management entity, using other protocols, e.g., Simple Network Management Protocol ("SNMP").

In a 3G network, the GGSN may be an appropriate EP, since the GGSN acts as a gateway node that can easily control 3G resources. The DP (often referred to as the Policy Server, "PS") may reside inside or outside of the GGSN. Typically however, the DP is separated from the GGSN and there is an open interface between the PS and the GGSN.

Since the different functions of a policy system are located in separate logical entities, there is a need for policy transaction protocol(s), which function as the intermediary between the policy (database), the policy client (enforcer), and the policy server (decision maker). The policy transaction protocol is responsible for transferring the policy request and policy response between these two nodes. The de-facto standard for such a policy transaction protocol is the IETF standardized protocol COPS.

COPS is a simple query-and-response protocol for exchanging policy information between a policy server and its client(s). Once a policy server makes a decision, the policy client is responsible for the enforcement of that particular policy decision. COPS also has the unique feature of allowing the policy control decision to be communicated between the policy client and the policy server in order to determine the validity of that decision. While COPS is currently primarily used as an RSVP admission control protocol, the IETF is currently studying the idea of extending COPS to be a generalized policy communications protocol.

For operators providing both GPRS IP connectivity service and IP Multimedia service, there is a need to have the capability to handle the IMS users and the GPRS IP connectivity users differently for charging, prioritization, and other purposes. For example, a GPRS bearer of a high QoS bearer should only be permitted to be used to transport IMS media. This requirement may be logically extended to have control over different types of bearers, dependent on the subnetwork or service network they are connecting to, or the application that they are working towards. The requirement may also be logically extended to allow restriction of the GPRS bearer types to be controlled from an application.

The restrictions an operator may want to apply is, for example, strict control of the destination for data that is allowed to enter the network, because the service may have destination dependent charging and/or may be performing resource reservation for the connection.

If the charging is based on the time from IM session beginning through to IM session end, it is essential that the user cannot use these bearer resources without being charged, that is, the user should not be permitted to utilize the access network resources for any period without being charged.

Conventional GPRS and IMS mechanisms currently permits the bearer service to be established independent of the session state. The user is permitted to use the access network (e.g., UMTS) resources prior to the start of call charging, but a charging rate specific for the access bearer is applied for unauthorized data flow prior to the active phase. That is, the charge applied for the access bearer is different dependent on the current session state. If the session already exists, there may be no access bearer charge, but if it does not exist, there may be access bearer charges even if any data sent on the bearer is subsequently discarded. A disadvantage of using this method is that a very complex charging model is required.

In addition, resources that are not authorized and charged appropriately should not be reserved. However, in order to avoid voice clipping, the bearer must be available and established prior to the beginning of the session through event. Therefore, there are conflicting considerations.

Accordingly, there is a need to provide a better filtering and gating control of network data flow using policy mechanisms.

SUMMARY

The present invention addresses these and other concerns by employing policy mechanisms using the architecture defined in TS 23.207 to provide policy driven filtering and gating of data flow over a QoS connection in a packet data network, such as a UMTS/GPRS network. The local SIP proxy server may be any local application server and a Policy Control Function ("PCF") is located in a separate node, such as a policy server, with an interface between the application server and the PCF, and between the GGSN and the PCF.

According to one aspect, a method of filtering and gating data flow in a QoS connection between a remote host and user equipment in a packet data network using policy control mechanisms includes a remote host, or the user equipment, initiating an application in an application server, such as an SIP proxy server, a Real-Time Streaming Protocol ("RTSP") server, or any type of IP based application server that supports an IP based application controlled by end-to-end signaling, and initiating a corresponding session between the remote host and the UE via the application server. The UE requests, to a GGSN of the network, establishment of a network bearer service between the UE and the remote host. A corresponding PCF in a policy server receives, from the application server, filtering data derived from session data received by the application server during the session. The GGSN interrogates the corresponding PCF in the policy server to initialize a gate using policy control filtering data at the GGSN. The gate then filters the data flow in the QoS connection according to the policy control filtering data.

According to a further aspect, the gate is opened when the application server sends an event trigger(s) to the policy server to request a gate opening and the policy server sends a corresponding gate open command to the gateway support node to open the gate. The gate is opened by the gateway support node to initiate the data flow in the QoS connection with the data flow being filtered by the according to the policy control filtering data.

According to still a further aspect, the gate is closed when the application server sends an event trigger(s) to the policy server to request a gate closing and the policy server sends a corresponding gate close command to the gateway support node to close the gate. The gate is closed by the gateway support node to end the data flow in the QoS connection. Also, the session is terminated by the application server and the network bearer service is terminated.

In another aspect, the application server exchanges information with the policy server over an open interface.

In yet another aspect, a COPS protocol is used to transfer policy decisions from the policy control function to the gateway support node. The policy control function acts as a COPS policy decision point and the gateway support node acts as a COPS policy enforcement point. The policy enforcement point controls access to QoS for a given set of IP packets that match a packet classifier. The policy decisions are either pushed to the gateway support node by the policy control function or the gateway support node requests policy information from the policy control function upon receipt of an IP bearer resource request.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which:

FIG. 1 is a block diagram of an high level IP network;

FIG. 2 is a block diagram depicting an example of a network employing end-to-end integrated services;

FIG. 10 is a table of UMTS QoS classes;

FIG. 11 is a table of QoS attributes;

FIG. 12 is a table providing an overview of some uses for the QoS attributes in FIG. 11;

FIG. 14 is a table of valid combinations of TFT packet filter attributes;

FIG. 20 is a message flow diagram between elements of FIG. 19 according to an embodiment of the invention.

DETAILED DESCRIPTION

Preferred embodiments of the present invention are described below with reference to the accompanying drawings. In the following description, well-known functions and/or constructions are not described in detail to avoid obscuring the invention in unnecessary detail.

In the following description, User Equipment ("UE") is a device allowing a user access to network services. For the purpose of 3GPP specifications, the interface between the UE and the network is the radio interface. A UE can be subdivided into a number of domains, the domains being separated by reference points. The aspect of separating the UE into several domains is not necessary to describe the invention and is therefore not a part of the description.

A Radio Access Network domain includes physical entities, which manage the resources of the radio access network, and provides the user with a mechanism to access the core network. The Access Network Domain comprises the functions specific to the access technology.

Figure 3:
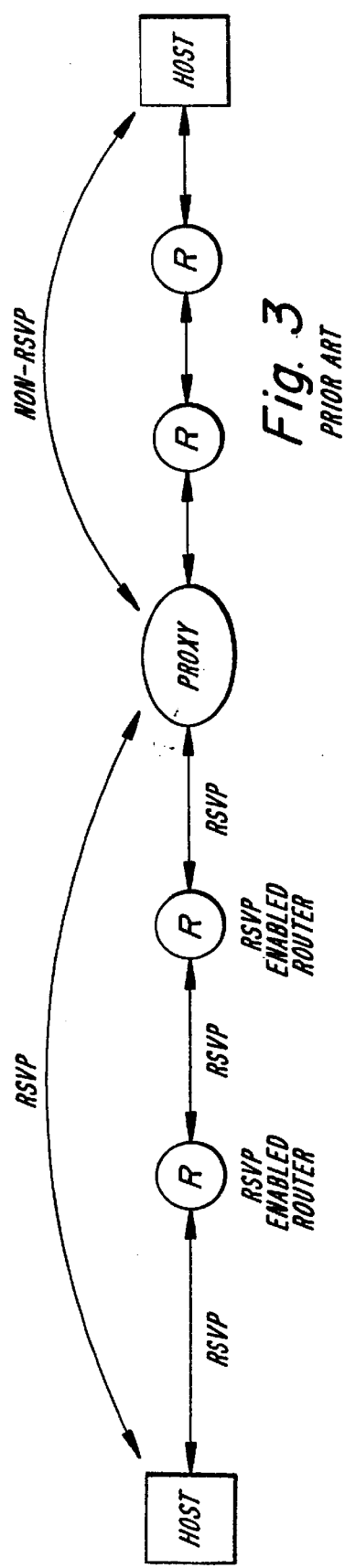
FIG. 3 is a block diagram depicting an example of a network employing an RSVP proxy.
Figure 4:
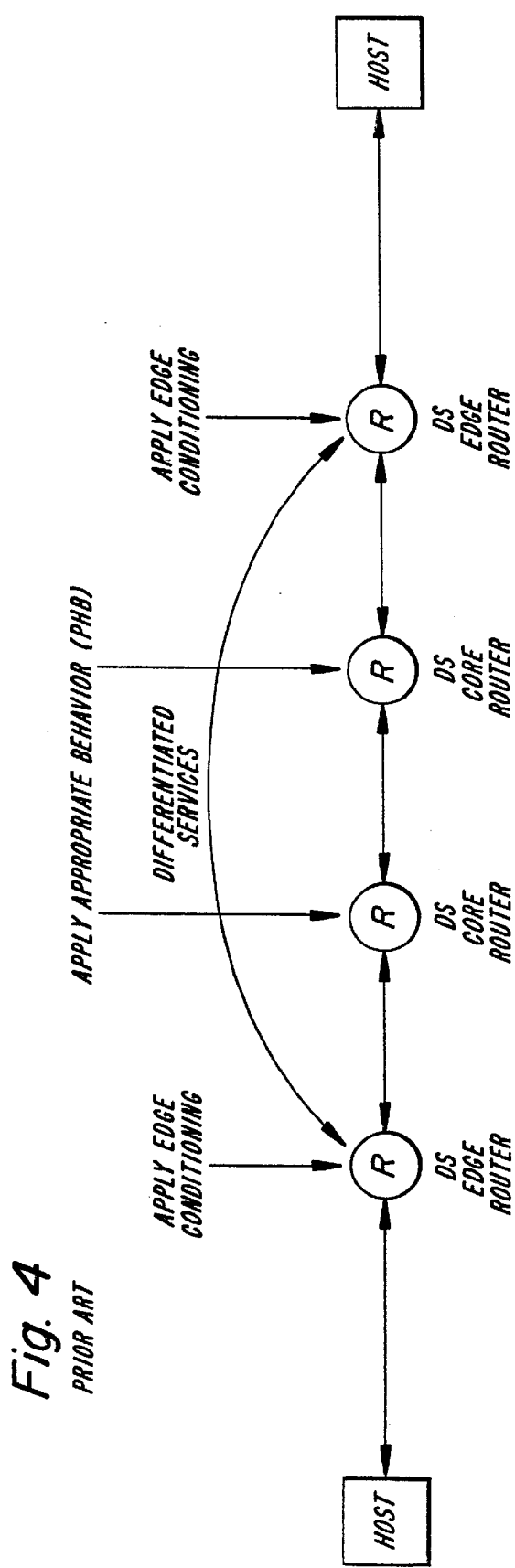
FIG. 4 is a block diagram depicting an example of a network employing end-to-end differentiated services.
Figure 5:
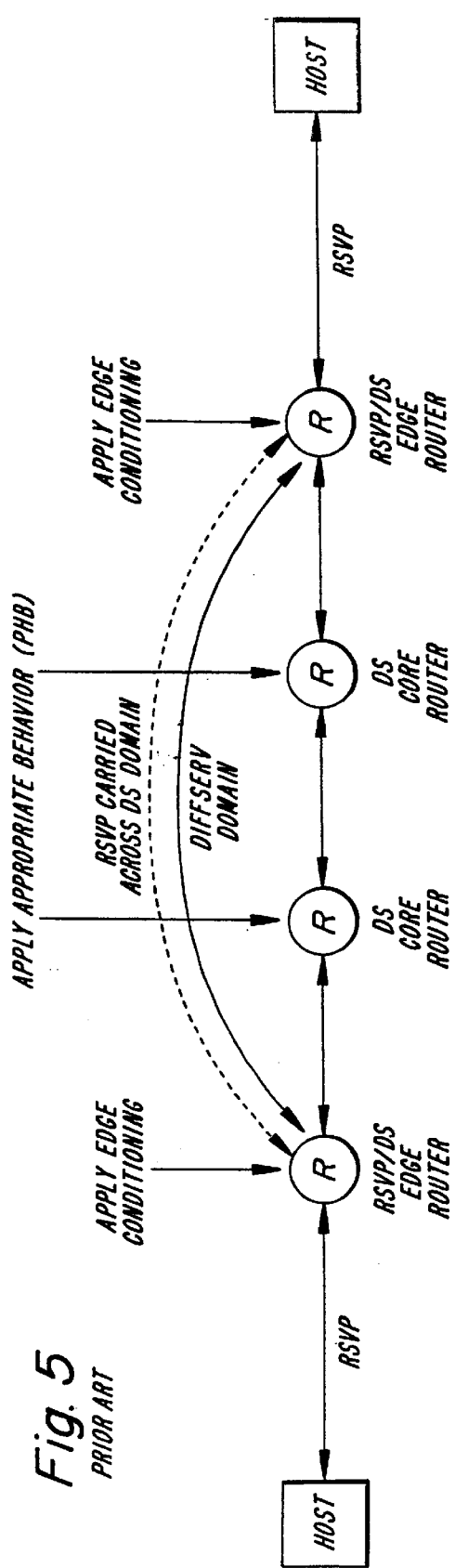
FIG. 5 is a block diagram depicting an example of a network employing RSVP signaling interworking with differentiated services.
Figure 6:
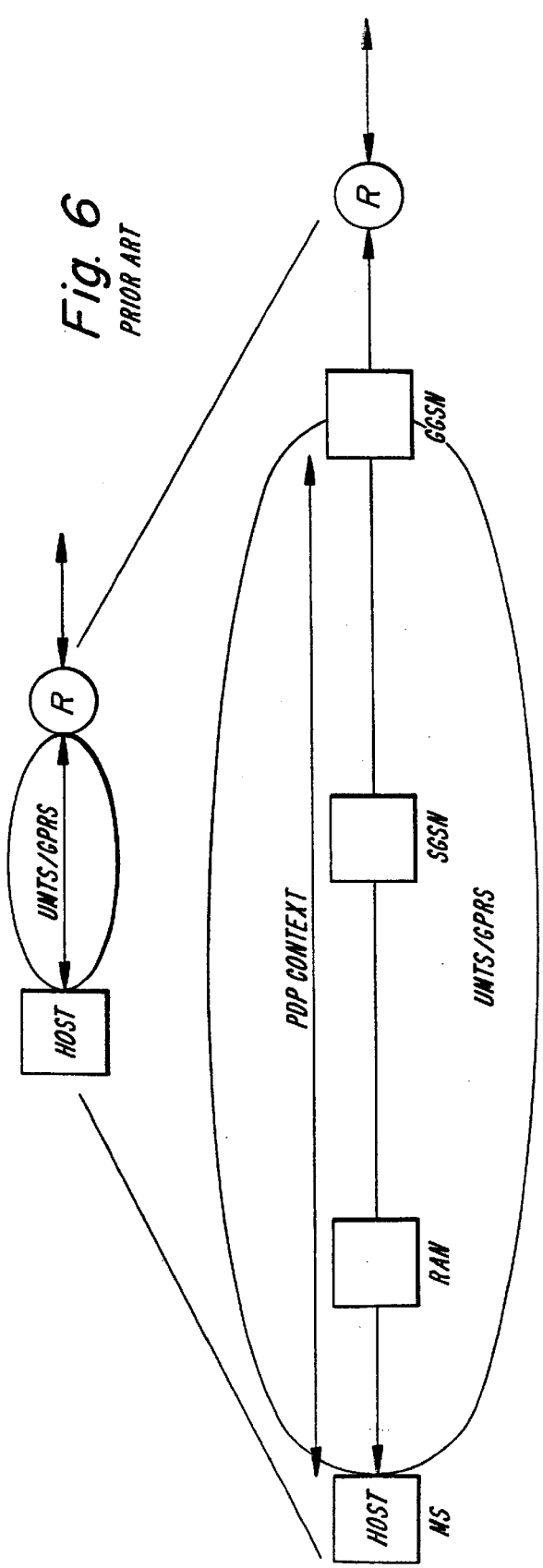
FIG. 6 is a block diagram depicting a Mobile Access Data Network modeled as a DiffServ.
Figure 7:
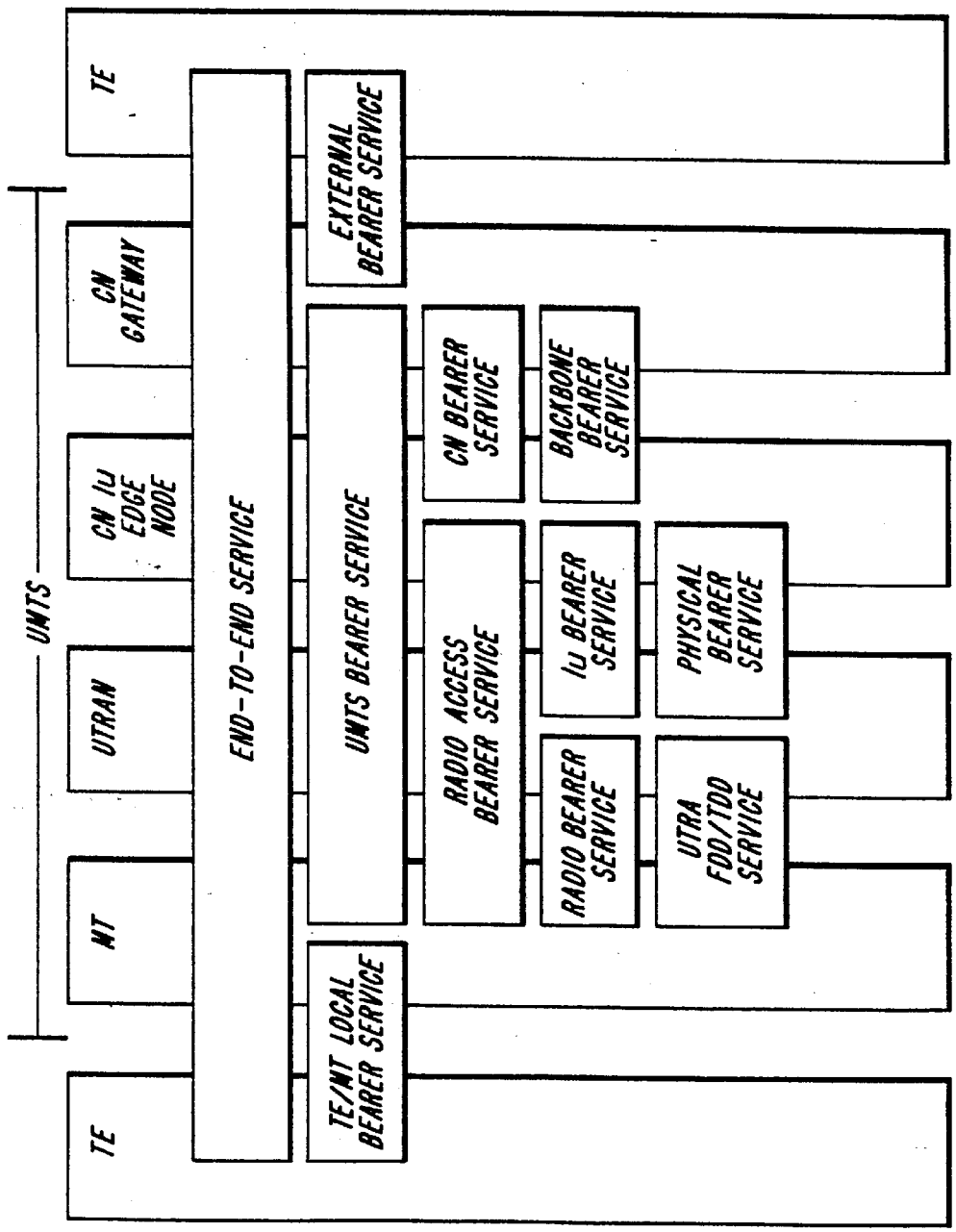
FIG. 7 is a block diagram of a UMTS QoS architecture.
Figure 8:
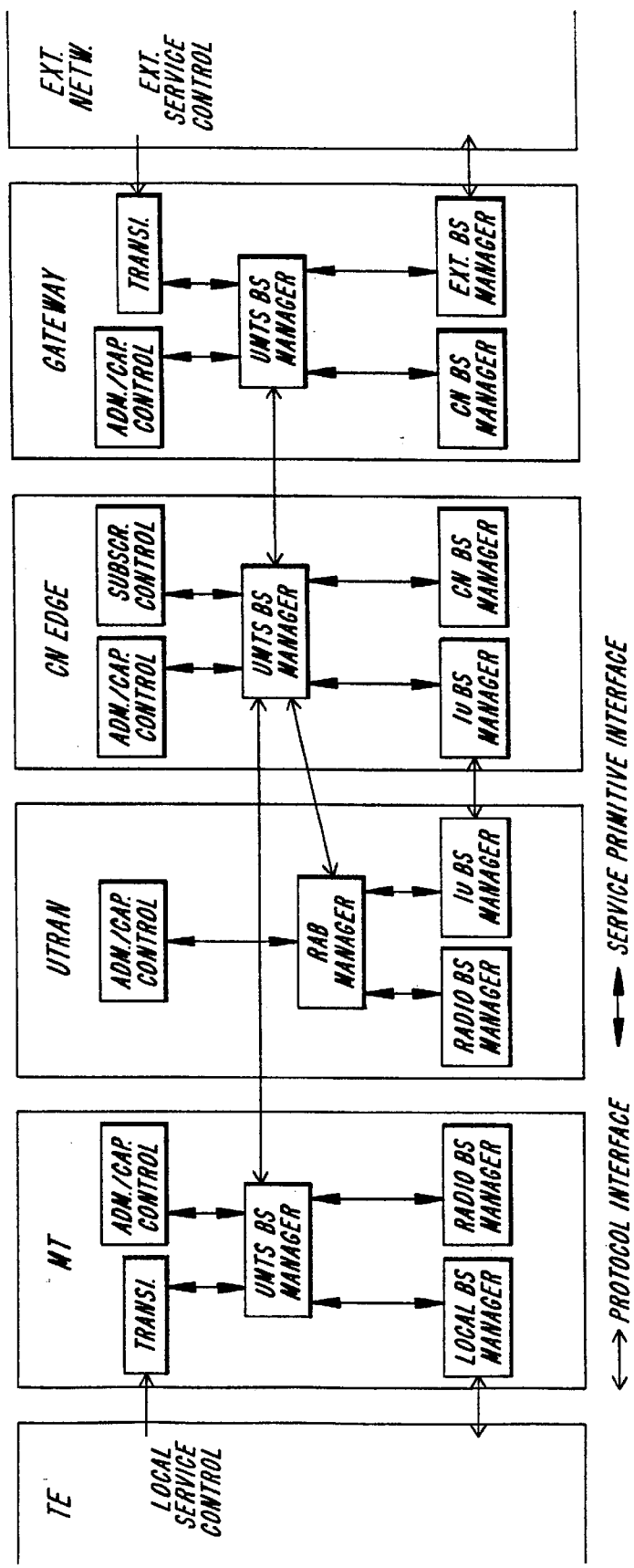
FIG. 8 is a block diagram depicting QoS management function for UMTS bearer service in the control plane.
Figure 9:
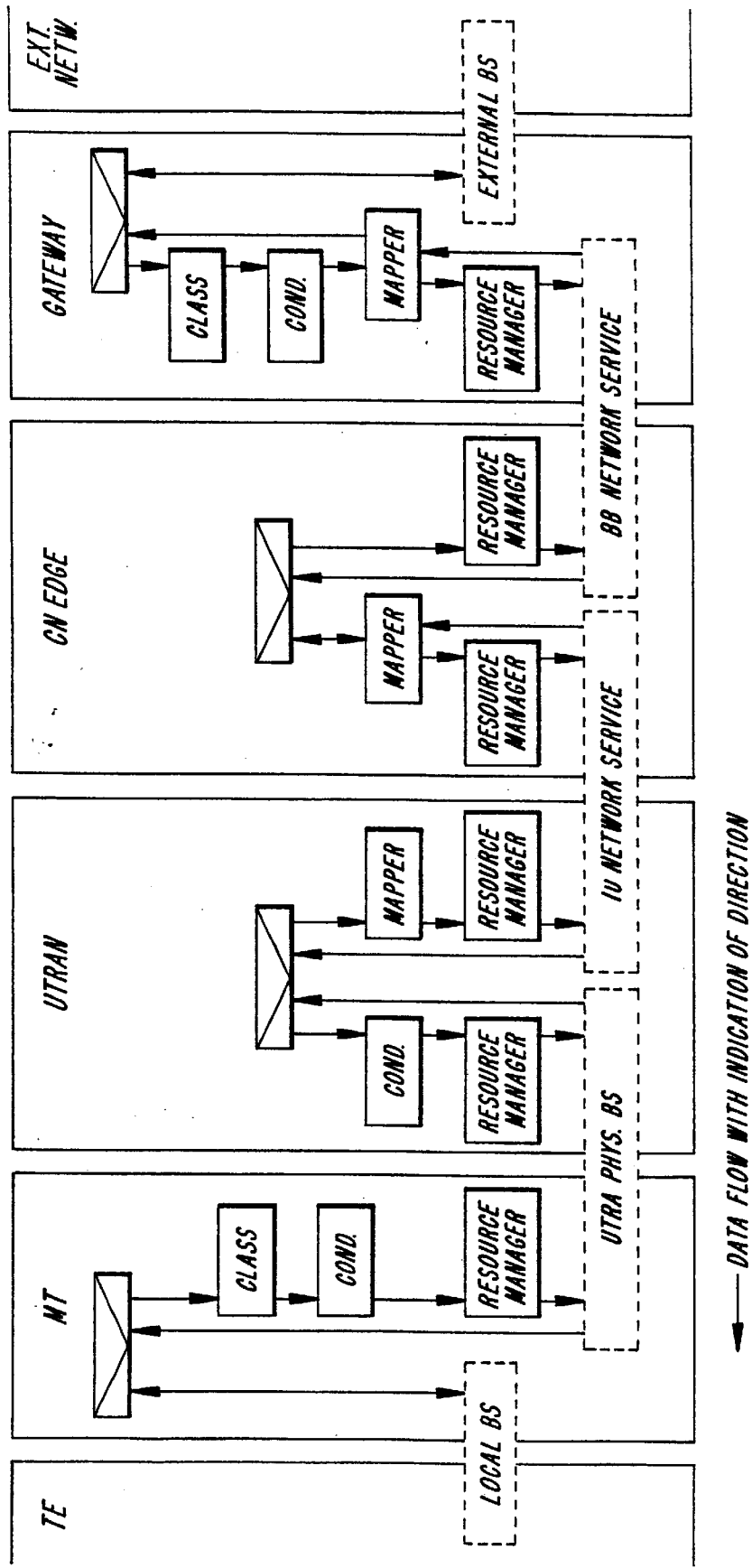
FIG. 9 is a block diagram depicting QoS management functions for UMTS bearer service in the user plane.
Figure 13:
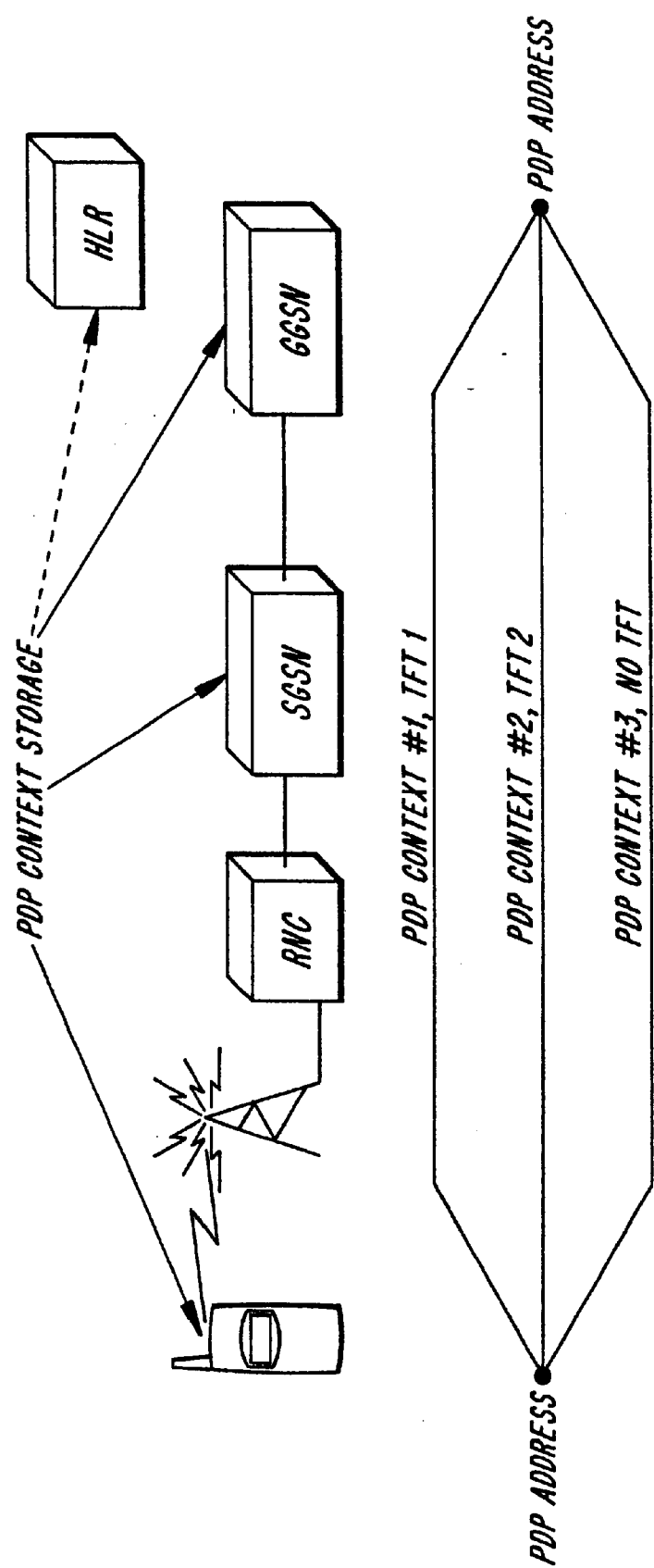
FIG. 13 is a block diagram of the relationship between PDP address, PDP context, and TFT.
Figure 15:
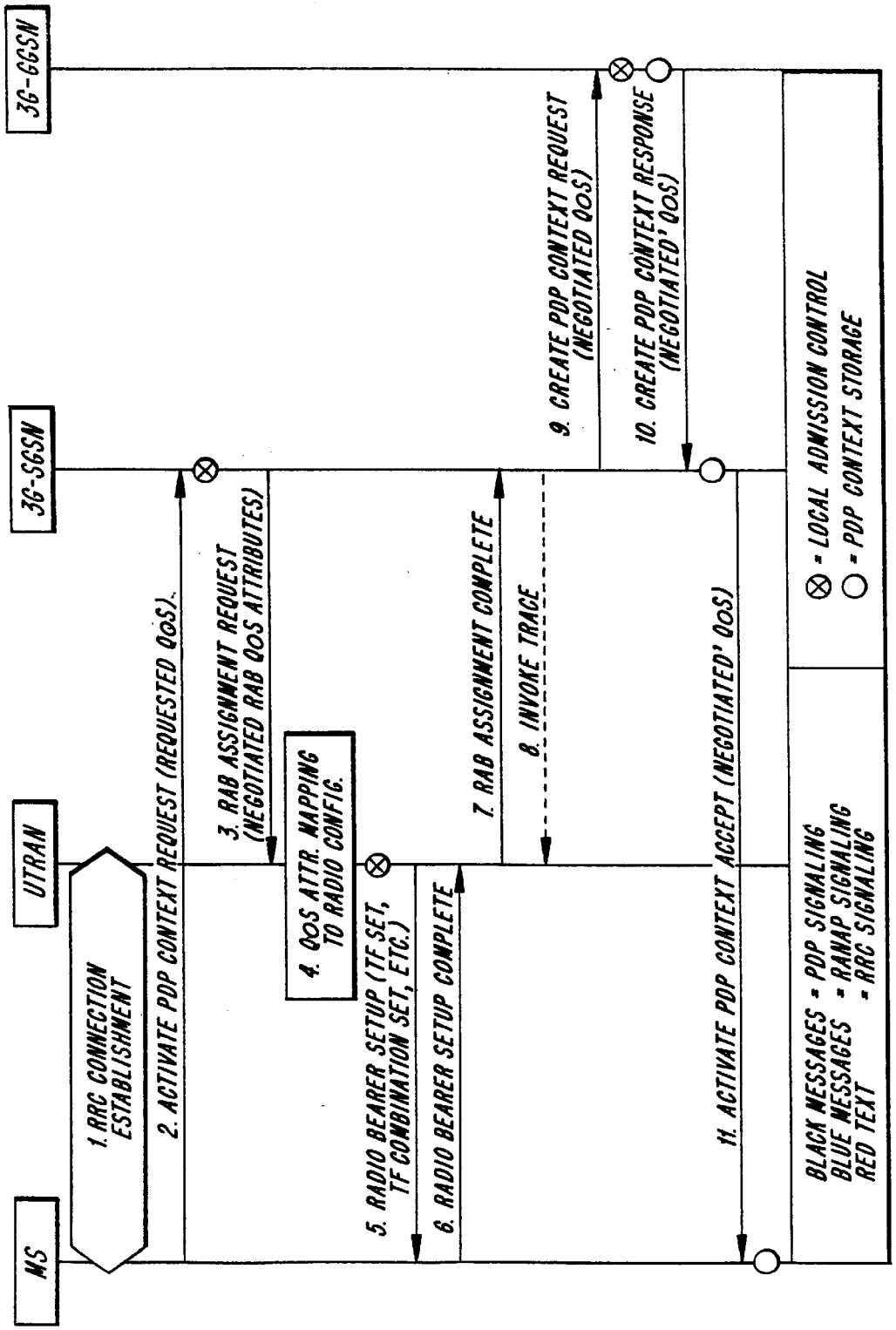
FIG. 15 is a diagram of PDP context message exchanges.
Figure 16:
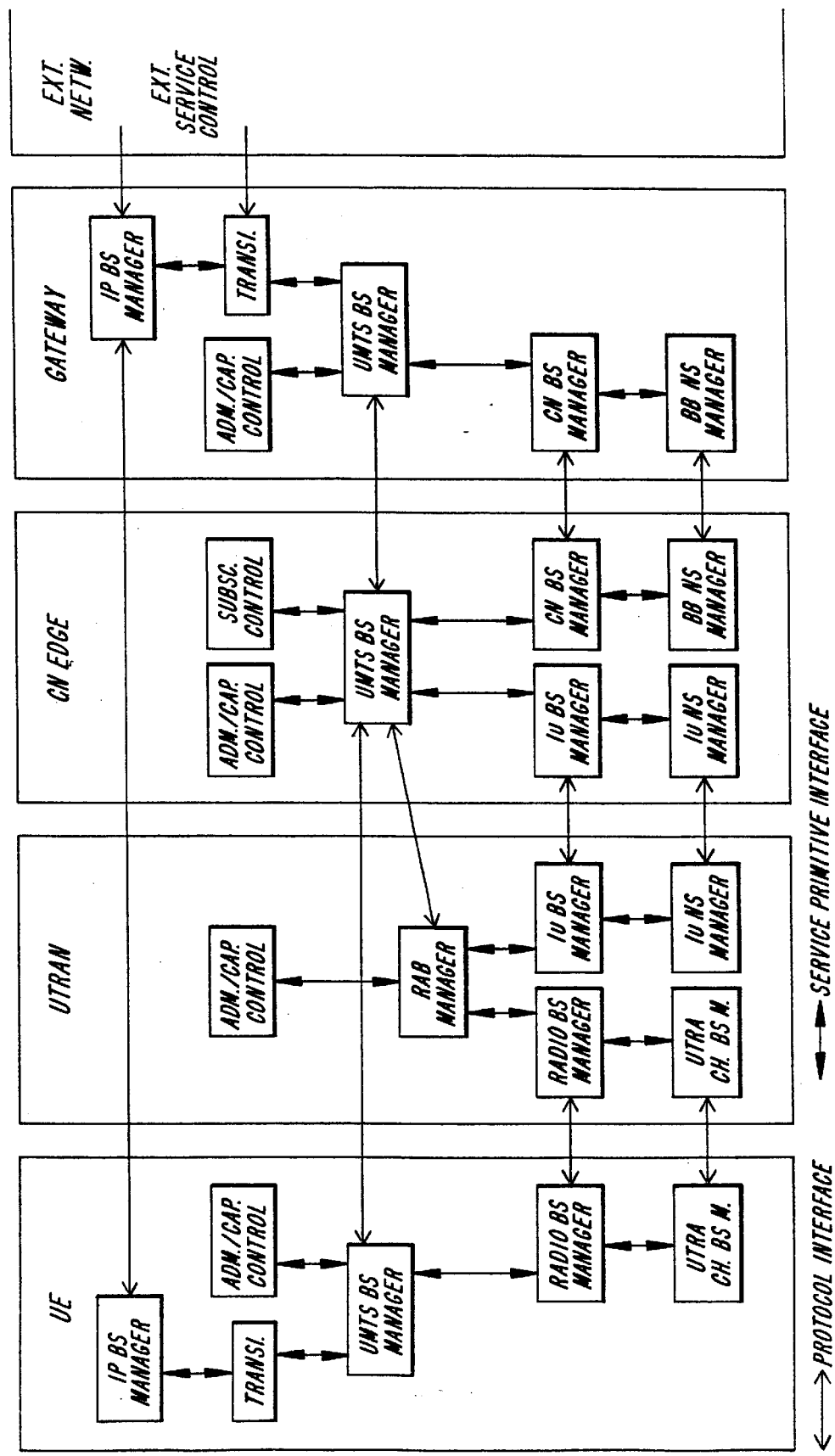
FIG. 16 is a block diagram of the QoS management functions for UMTS bearer service in the control plane and QoS management functions for end-to-end IP QoS.
Figure 17:
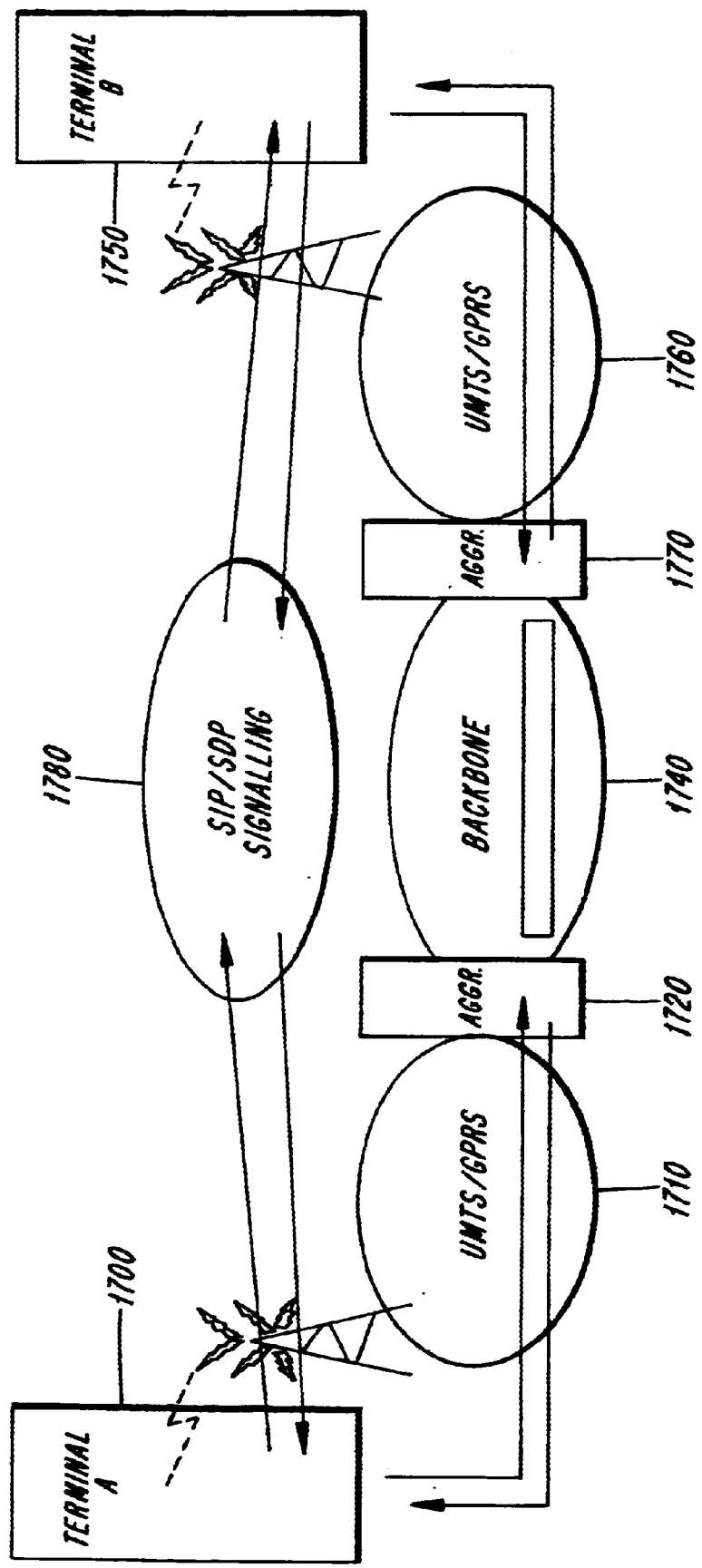
FIG. 17 illustrates the interrelation of an IP Multimedia system to GPRS bearers.
Figure 18:
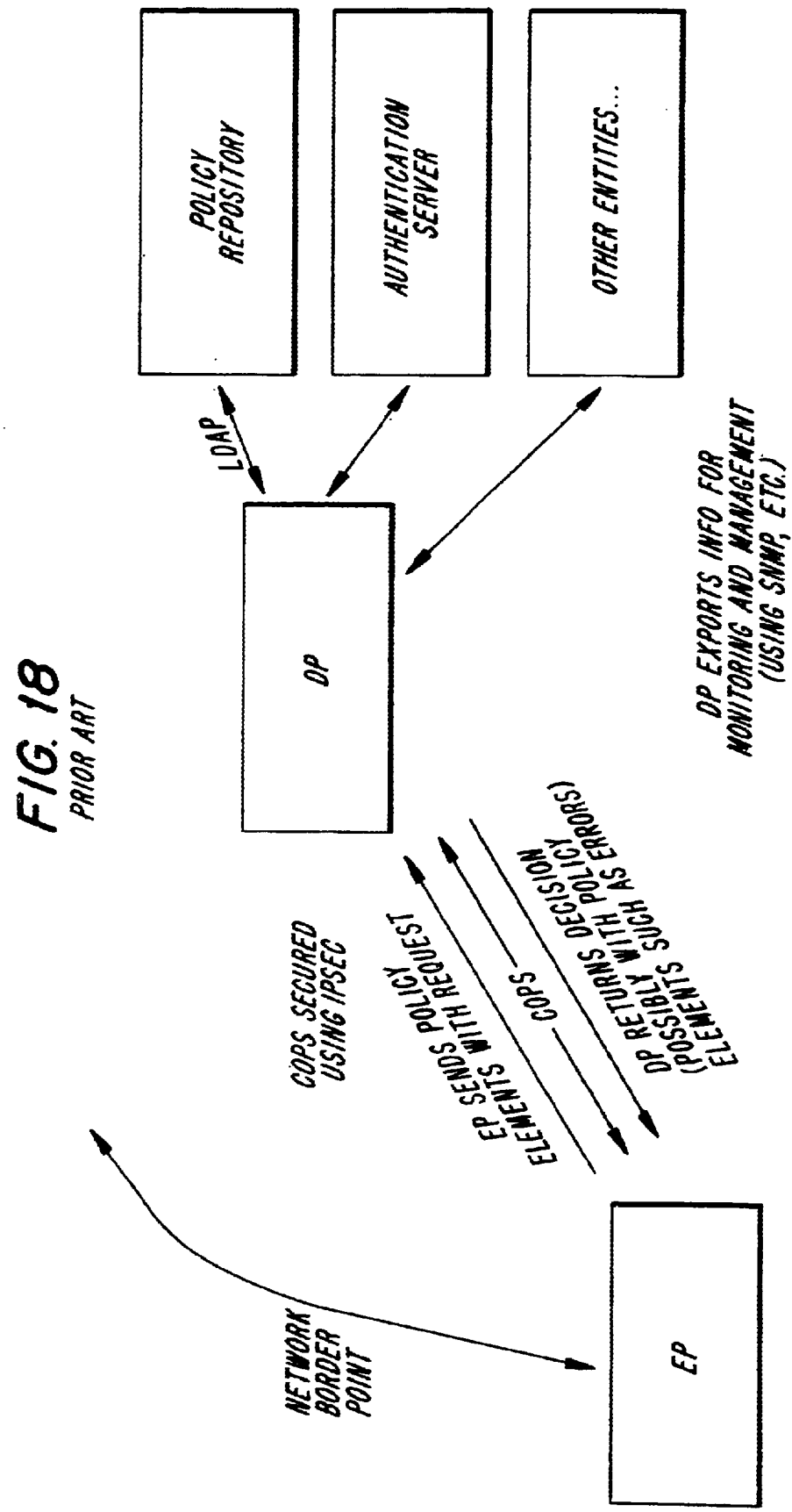
FIG. 18 illustrates the IETF Policy Framework.
Figure 19:
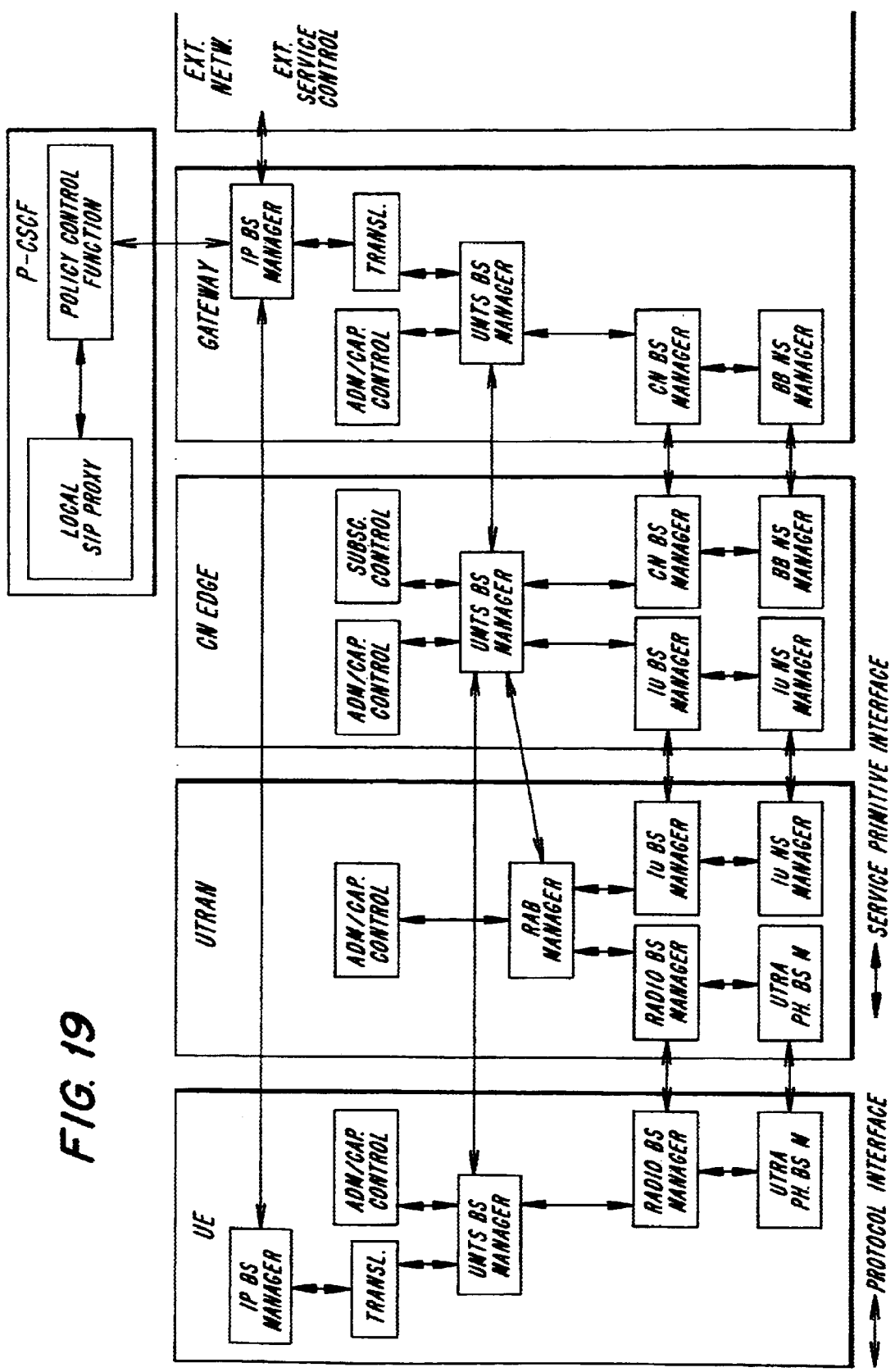
FIG. 19 is a block diagram of the QoS management functions for UMTS bearer service in the control plane and QoS management functions for end-to-end IP QoS with a policy control function in accordance with the invention.

Turning again to the drawings, FIG. 19 is a block diagram of the QoS management functions for a UMTS bearer service in the control plane and QoS management functions for end-to-end IP QoS with a policy control function in accordance with the invention. With reference to the control flow diagram of FIG. 20, the remote host initiates an application, in this case a telephony call, using SIP signaling (1). The SIP signaling passes through a SIP proxy server within the network. The SIP session identifies the end points within the telephony network by their IP addresses, which reside within the addressing space of the telephony network. However, if the call does not terminate within this telephony network, the addresses are the gateway address within the telephony network that the bearer passes through.

After the session is started (2), the UE will need to establish the QoS enabled GPRS bearer for the data plane. This may occur during the session establishment as part of the pre-conditions for the session. The UE must select the access bearer type to be used based on the required characteristics, such as a conversational bearer, and it initiates a PDP context for the bearer level.

The UE then requests establishment of the UMTS bearer (3). The translation/mapping function in the GGSN maps the UMTS bearer service into a detailed description of an IP service that is being provided for use over the access network. In the GGSN, the bearer request is associated with a PCF, which the GGSN interrogates to determine whether establishing the particular access IP bearer service is permitted (4). The PCF may apply rules that restrict the use of specific access bearers dependent on network factors, such as the involvement of the Local SIP Proxy Server. Since the PCF is informed that the Local SIP Proxy Server is in use for this connection, the use of this bearer type is approved.

The authority to establish the access bearer is independent from the authority to transmit data into the telephony network. Once the bearer is established, a "gate" is established at the GGSN that controls what data is permitted to enter the telephony network (6). This gate performs classification and policing of the data, similar to the DS edge functionality. The gate is controlled by data received from the application through the PCF.

Prior to the session reaching the active phase, the UE may send data regarding the proposed usage of the access bearer to the GGSN. This information may be sent to the GGSN either through IP level signaling such as RSVP, or it could be derived from the GPRS bearer parameters.

When the GGSN receives information about the traffic usage for this bearer, the IP BS Manager may authorize the usage of the bearer (5). If the proposed usage does not agree with that authorized by the SIP proxy server, the GGSN may reject the bearer establishment, or the session establishment in the case of RSVP. The SIP proxy server by this time must have supplied information to the PCF regarding the authorized traffic descriptor (2).

When the session reaches the appropriate state (i.e., the active phase), the SIP proxy sends a "session thru" event trigger to the PCF, which informs the PCF to send a gate open command to the GGSN, resulting in the opening of the gate at the GGSN to allow the data from the user equipment to enter the network (7).

When the session is finished, the SIP proxy server revokes authorization for both the session and the bearer level. The SIP proxy server also closes the gate that has been opened from the GGSN towards the telephony network. This action occurs at several different levels. The SIP proxy server terminates the session directly to the UE and sends a "session termination" event trigger to the PCF, which informs the PCF to send a gate close command to the GGSN, resulting in the closing of the gate at the GGSN. Finally, the SIP proxy server sends information to the PCF that results in the termination of the bearer, if the bearer termination has not already been initiated from the UE.

Alternatively, the PCF may receive information from different applications that want to apply control to various functions. The application server support in the network may be provided by the proxy server, a Real-Time Streaming Protocol ("RTSP") server in the network, or any type of IP based application support, where the IP based application is controlled by end-to-end signaling. While the function the different applications are controlling within the GGSN may be the same, the actual information supplied by the application and how that information is used may differ. Therefore, there may be a range of protocols between the PCF and the applications.

The session must be in an appropriate state before the bearer service is authorized. When the IP BS Manager in the GGSN contacts the PCF, the PCF decides not just whether the UE is authorized for the bearer type, but whether the application has approved the connection to be made at this time. A number of event triggers may be defined for a specific application. When an application event occurs, the event trigger is sent from the application server to the PCF. At the PCF, this may result in a command being sent to the GGSN and corresponding policy enforcement action in the GGSN, such as in the case of the exemplary "session thru" and "session termination" event triggers described above.

There are different actions within the policy enforcement that may be applied by the IP BS Manager. For example, if data is received that is not allowed through the gate, the IP BS Manager may take actions, such as discarding the data or terminating the bearer. The scope of policy enforcement options must be determined and considered when selecting the protocol to be used between the IP BS Manager and the PCF for each policy function.

One aspect of the invention is that the "gating" function in the GGSN receives configuration data from the SIP proxy server via the PCF. The configuration data restricts the usage to only one destination address.

In another embodiment, the invention is described using the terminology, concepts, and framework of COPS as applied to the UMTS and GPRS systems. Recent developments in IETF surrounding IP policy framework and protocols reflect an industry thrust to provide services with appropriate QoS to users who are willing to pay for better than best effort services. Some relevant IETF RFC's on the subject matter include [RFC 2573] "A Framework for Policy-based Admission Control", [RFC 2748] "The COPS Protocol", [RFC 2749] "COPS usage for RSVP", etc.

The PCF function employed in UMTS can be conformed to IETF standards to leverage the expertise and developments in the mainstream IP community.

A PCF is a logical policy decision element which uses standard IP mechanisms to implement policy in the IP bearer layer. These mechanisms may be conforming to, for example, the framework defined in IETF [RFC 2753] "A Framework for Policy-based Admission Control," where the PCF is effectively a DP. The PCF makes decisions in regard to network based IP policy using policy rules, and communicates these decisions to the IP BS Manager in the GGSN, which is the IP EP.

The protocol interface between the PCF and GGSN supports the transfer of information and policy decisions between the DP and the IP BS Manager in the GGSN.

COPS protocol is used as the client/server protocol between the EP and the PCF. The COPS client (EP) can request policy information from the PCF triggered by a QoS enabled radio bearer request message. Alternatively, policy decisions made by the PCF can be pushed to the COPS client (EP) based on an external out-of-band QoS service request, e.g., triggered by SIP messages that passes the SIP proxy, or alternatively other application signaling passing any application server in the network. These policy decisions are stored in the COPS client (in the Gateway) in a local policy decision point accessed by the EP to make admission control decisions without requiring additional interaction with the PCF.

The PCF makes policy decisions based on information obtained internally from the SIP proxy. The PCF is in the same domain as the GGSN or has a trust relationship with the GGSN.

The EP is implemented in the IP bearer service manager in the GGSN in order to meet UMTS architectural requirements. The EP controls access to QoS for a set of IP packets that match a packet classifier. Policy decisions are either "pushed" to the GGSN by a policy control function, or alternatively, the GGSN may request policy information from a policy control function on receipt of an IP bearer resource request.

Policy enforcement is defined in terms of a gate implemented in the GGSN. A gate is a policy enforcement function for a unidirectional flow of packets, e.g., in either the upstream or downstream direction. At a high level, a gate includes a packet classifier, a resource "envelope," and an action taken when the set of packets matching the classifier exceeds the resource envelope.

Unidirectional gates are used, since the basic unit of IP bearer service resource allocation is for unidirectional flows. For example, a downstream-only gate is used when an application on a UE has subscribed to an IP multicast session in a receive-only mode. A downstream-only flow is also needed to support "remote ringback" in an IP telephony application, where the ring-back signal is generated remotely by a PSTN gateway or remote UE. For this application, to avoid certain theft of service scenarios, it is necessary to enable the downstream flow of packets to the session originator, while not enabling the upstream flow of packets until the remote UE picks up. When access to QoS for a flow of packets in both directions is desired, a pair of gates is used.

The information that may be associated with a gate is described below. This information is not necessarily the only information that may be used, but is intended to cover some of the currently understood applications. A gate is described by the following information:

TABLE 2

Packet classifier
Authorized envelope
Action
Resource identifier
Reserved envelope The packet classifier associated with each gate is described by the following information:

TABLE 3

Direction
Source IP address
Destination IP address
Source port
Destination port
Protocol The direction indicates whether the gate is an upstream or downstream gate. The source IP address and port identify the source IPv4 or IPv6 address and port, as seen at the GGSN. The destination IP address and port identify the destination IPv4 or IPv6 address and port, as seen at the GGSN. The protocol field identifies the IP protocol type of the packet. With the exception of the direction, wild-cards can be used for the fields. For example, in a SIP session, the source port for the bearer is not exchanged in SIP signaling messages, and therefore cannot be set up when the gate is initialized.

The authorized envelope defines an upper bound, or "envelope," of the resources that are authorized for the set of packets defined by the packet classifier. The authorized envelope can authorize more resources than are actually used. Since the authorized envelope defines IP bearer resources towards or from the external network, it is appropriate to express it in terms of IP bearer resources, such as a peak information rate, mean information rate, and token bucket size to or from the external network. For example, an IntServ Flowspec is an appropriate representation of IP bearer resources. The authorized envelope is mapped to (a range of) UMTS bearer resources by the translation function in the GGSN when necessary. The authorized envelope allows the PCF to pre-authorize a flow, before the UE requests allocation of the resources ("push'" model).

The action defines what action is taken when the set of packets defined by the packet classifier exceeds the authorized envelope or reserved envelope (defined below). The action includes marking out-of-profile packets with a particular DiffServ Code Point ("DSCP"), marking in-profile packets with a particular DSCP, shaping to a token bucket, or packet dropping.

According to the above definitions, a set of packets may match more than one classifier. When this happens, the actions associated with each of the applicable gates are considered to be executed in sequence, in the order in which the gates were configured in the GGSN. Packets that are marked by a gate may not be re-marked by a subsequent gate to a DSCP corresponding to a better service class.

The resource identifier identifies a set of resources that can be shared by multiple gates, e.g., for several sessions. For example, the resource identifier might allow a UE to share a single set of resources for two sessions that do not simultaneously use the resources, such as during call waiting. The resource identifier would be included in the IP bearer service information element of a PDP context activation/modification request to support this function.

The reserved envelope defines an upper bound or "envelope" of the resources that are reserved for a bearer. The reserved envelope is advantageous when it is possible for a UE to reserve more resources than are actually used. For example, during call waiting, the UE might maintain a reservation for a high quality codec for a temporarily inactive session, while using a lower quality codec for the active session. The reserved envelope implies that resource reservation performs admission control, and if successful, sets aside the requested resources in a preemptible mode. Support for this functionality requires the PDP context activation and modification procedures to distinguish between reservation requests and resource use.

An authorization token uniquely identifies policy information corresponding to one or more gates at a GGSN. The authorization token can be used to correlate resource reservation requests from the UE (e.g., PDP context activation request) with authorization commands from the PCF. To support this function, the authorization token needs to be included in the PDP context activation request (radio bearer setup request), the policy control interface (between the PCF and the Gateway when the decision is forwarded from the PCF to the GGSN), and SIP signaling messages between the proxy CSCF and UE or any other associated application signaling. The authorization token contains a unique identifier for one or more gates initiated in the gateway and is a binding of the radio bearer under establishment to the decision made by the PCF, the decisions being forwarded to the gateway from the PCF in the message.

IP QoS admission control manages allocation of QoS resources based on administrative policy and available resources. Admission control based on administrative policy is performed using a client/server architecture involving policy enforcement in the IP bearer service manager in the GGSN, and a PCF. The COPS protocol is ideal for this interface.

The COPS protocol is used as the client/server protocol between the EP and the PCF. The COPS client (EP) can request policy information from the PCF triggered by a QoS signaling request. Alternatively, policy decisions made by the PCF can be pushed to the COPS client (EP) based on an external out-of-band QoS service request, e.g., triggered by SIP signaling. These policy decisions are stored in the COPS client in a local policy decision point accessed by the EP to make admission control decisions without requiring additional interaction with the PCF.

The COPS protocol supports several messages between a client and server. These messages include the following operations that may be performed:

TABLE 4

Client-Open/Client-Accept/Client-Close
Request
Decision
Report State
Delete Request State
Keep Alive
Synchronize State Request/Synchronize State Complete The pull (outsourcing) model represents a client-driven approach, wherein the PCF actively responds to incoming policy requests from the EP. One EP request may be followed by few PCF decisions. An asynchronous notification will allow the PCF to notify the EP in the GGSN whenever necessary to change earlier decisions, generate errors, etc.

The pull model may be used at PDP context activation and at PDP context modification. In subsequent phases, the push model may be used.

Considering the COPS pull model for the policy authorization, the messages sent by the EP are request, update, report and delete messages, whereas the messages sent from the PCF side are decision and update.

Additional information elements need to be included in COPS messages to support the UMTS QoS architecture. Consistent with the COPS framework, the policy control interface is identified by a unique "client type" allocated for a UMTS client (GGSN). The objects that are needed in the architecture are listed in Tables 5 and 6, and are described below.

TABLE 5 authorization token
command/response
one or more gate specs
event generation info
endpoint identifier
max gates The authorization token contains a unique identifier for one or more gates that are being referenced in the command or response. The authorization token supports multiple policy control functions that may be providing policy control of a GGSN.

The commands that are used from the PCF to the EP include commands to:

TABLE 6 allocate an authorization token
authorize QoS resources for one or more media flows
commit QoS resources
revoke authorization of QoS resources
get parameters/information associated with an authorization token The responses that are needed from the EP to the PCF include an acknowledgment and/or an error response to each of these commands.

A gate spec object contains the specification of the gate parameters that are being set or returned in a response. A command or response should be able to contain one or more gate spec objects associated with an authorization token, as outlined in Table 7.

TABLE 7

Direction
Source IP address
Destination IP address
Source Port
Destination Port
Protocol
Action
DSCP Field
Flowspec The event generation info contains information related to usage recording that may be needed for IP QoS bearers. This might include a "billing identifier" needed to correlate event records from the GGSN with event records from the proxy CSCF, so that all records associated with the same session can correspond. In order for the billing identifier to be unique, it might include, for example, a long numeric value generated by the PCF, along with the identity of the PCF.

The endpoint identifier and max gates fields are used to prevent a UE-initiated denial of service attack that attempts to set up an excessive number of simultaneous sessions, resulting in the allocation of multiple gates. The endpoint identifier contains the identity (e.g., IP address) of the endpoint associated with the authorization token, while the max gates field contains the maximum number of gates that can be allocated to this particular endpoint. The GGSN can return an error if the number of allocated gates exceeds max gates.

The described invention can advantageously be standardized in 3GPP systems.

It will be appreciated that the steps of the methods illustrated above may be readily implemented either by software that is executed by a suitable processor or by hardware, such as an application-specific integrated circuit ("ASIC").

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of filtering and gating data flow in a QoS connection between a remote host and user equipment in a packet data network using policy control mechanisms, the method comprising the steps of:

initiating, by one of the remote host and the user equipment, an application, supported by an application server within the network, and a corresponding session between the remote host and the user equipment via the application server;

requesting, to a gateway support node of the network by the user equipment, establishment of a network bearer service between the user equipment and the remote host, said network bearer service being differentiated by allowing different degrees of QoS;

receiving, by a corresponding policy control function in a policy server, from the application server, filtering data derived from session data received by the application server from the user equipment and remote host during the session, said filtering data being processed by the policy control function to derive corresponding policy control filtering data;

interrogating, by the gateway support node, the corresponding policy control function in the policy server to determine whether the establishment of the network bearer service is permitted; and if the establishment of the network bearer service is permitted, then establishing a gate at the gateway support node, said gate being initialized with the policy control filtering data received either as a result of the gateway support node's interrogation of the policy control function or as a result of the policy control filtering data being pushed by the policy server to the gateway support node, wherein said gate is initialized to filter the data flow in the QoS connection.

2. The method of claim 1, comprising the additional steps of:

sending, by the application server, an event trigger(s) to the policy server to request a gate opening;

sending, by the policy server, a corresponding gate open command to the gateway support node to open the gate, said gate opening initiating the data flow in the QoS connection; and filtering, by the gate, the data flow in the QoS connection according to the policy control filtering data.

3. The method of claim 2, comprising the additional steps of:

sending, by the application server, an event trigger(s) to the policy server to request a gate closing;

sending, by the policy server, a corresponding gate close command to the gateway support node to close the gate;

closing the gate to end the data flow in response to the gate close command;

terminating the session with the user equipment by the application server; and terminating the network bearer service.

4. The method of claim 1, wherein the application server is an SIP proxy server.

5. The method of claim 4, wherein said SIP proxy server exchanges information with the policy server over an open interface.

6. The method of claim 1, wherein the application server is a Real-Time Streaming Protocol ("RTSP") server.

7. The method of claim 6, wherein said RTSP server exchanges information with the policy server over an open interface.

8. The method of claim 1, wherein the application server supports any type of IP based application, said IP based application being controlled by end-to-end signaling.

9. The method of claim 8, wherein said IP based application server exchanges information with the policy server over an open interface.

10. The method of claim 1, wherein said gateway support node exchanges information with the policy server over an open interface.

11. The method of claim 1, wherein the filtering data includes traffic descriptors.

12. The method of claim 1, wherein the gate receives objects included in the policy control filtering data, said objects containing the specification of the gate parameters that are being set or returned in a response, said objects including Direction, Source IP address, Destination IP address, Source Port, Destination Port, Protocol, Action, DSCP Field, and Flowspec.

13. The method of claim 1, wherein the user equipment establishes a QoS enabled GPRS radio bearer service for the connection during the session establishment between the remote host and the user equipment, said QoS enabled GPRS radio bearer service being used for the QoS enabled transport of IP packets between the user equipment and the gateway support node as one segment of an end-to-end transport between the user equipment and the remote host.

14. The method of claim 13, wherein the QoS enabled GPRS radio service bearer is translated to a detailed description of an IP service that is being provided for use in the gateway support node.

15. The method of claim 14, wherein the gateway support node determines the usage of the QoS enabled radio bearer service based on usage information received from the user equipment and the gateway support node rejects a request for the radio bearer service when the usage does not comply with policy decisions established in the gateway support node.

16. The method of claim 1, wherein the policy control function applies rules that restrict the use of specific access bearers depending on the filtering data.

17. The method of claim 1, wherein the gate, as part of a policy enforcement within the gateway support node, filters the data flow by one of discarding data or ending the network bearer service when unauthorized data is detected.

18. The method of claim 1, wherein a COPS protocol is used to transfer policy decisions from the policy control function to the gateway support node, the policy control function acting as a COPS policy decision point and the gateway support node acting as a COPS policy enforcement point, said policy enforcement point controlling access to QoS for a given set of IP packets that match a packet classifier.

19. The method of claim 18, wherein the policy decisions are either pushed to the gateway support node by the policy control function, or the gateway support node requests policy information from the policy control function upon receipt of an IP bearer resource request.

20. The method of claim 18, wherein the policy control function and gateway support node exchange at least the following types of COPS information and procedures: Client-Open/Client-Accept/Client-Close, Request, Decision, Report State, Delete Request State, Keep Alive, Synchronize State Request/Synchronize State Complete.

21. The method of claim 18, wherein the policy control function and gateway support node exchange at least the following policy related radio network specific elements: authorization token, command/response, one or more gate specs, event generation information, endpoint identifiers, max gates.

22. The method of claim 21, wherein the commands include at least commands to: allocate an authorization token, authorize QoS resources for one or more media flows, commit QoS resources, revoke authorization of QoS resources, get parameters/information associated with an authorization token, and the responses include an acknowledgment and/or an error response to each of these commands.

23. The method of claim 21, wherein the event generation information includes information related to usage recording used for IP QoS bearers, the information including a billing identifier to correlate event records from the gateway support node with event records from a proxy Call State Control Function, so that all records relating to the same session can be associated.

24. The method of claim 21, wherein the endpoint identifier and the max gates fields are used to prevent a user equipment initiated denial of service attack attempting to set up an excessive number of simultaneous sessions that result in the allocation of multiple gates, the endpoint identifier containing an identity of the endpoint associated with an authorization token, while the max gates field contains the maximum number of gates that can be allocated to this particular endpoint.

25. The method of claim 21, wherein one gateway support node request for policy information from the policy control function (a pull request), upon receipt of an IP bearer resource request, may be followed by few policy control function decisions and where an asynchronous notification will allow the policy control function to notify the policy enforcement point in the gateway support node whenever necessary to change earlier decisions or generate errors, and where pull requests may be used at network bearer setup and at network bearer modification and in subsequent phases the policy decisions are pushed to the gateway support node by the policy control function.

26. The method of claim 21, wherein the authorization token uniquely identifies policy information corresponding to one or more gates at the gateway support node and is used to correlate resource reservation requests from the user equipment with authorization commands from the policy control function, the authorization token being included the network bearer request message, in the messages used over a policy control interface between the policy control function and the gateway support node used when the decision is forwarded from the policy control function to the gateway support node, and in SIP signaling messages between the application server, being an SIP proxy server, and the user equipment, the authorization token containing a unique identifier for one or more gates initiated in the gateway support node and being a binding of the radio bearer under establishment to the decision made by the policy control function, said decisions being forwarded to the gateway support node from the policy control function in a message.

27. The method of claim 26, wherein the network bearer request is a QoS enabled GPRS radio bearer service carrying the authorization token in GPRS activation/modification request messages.

28. The method of claim 26, wherein the authorization token supports multiple policy control functions that may be providing policy control of a gateway support node.

29. The method of claim 1, wherein the gate is described by at least a Packet classifier, Authorized envelope, Action, Resource identifier, and Reserved envelope.

30. The method of claim 29, wherein the packet classifier associated with each gate is described by at least a Direction, Source IP address, Destination IP address, Source port, Destination port, and Protocol.

31. The method of claim 1, wherein the packet data network is a UMTS network.

32. The method of claim 1, wherein the session is an SIP session.

33. The method of claim 1, wherein the connection is an end-to-end IP QoS connection.

34. A method of filtering and gating packet data flow in a packet data network using policy control mechanisms, the method comprising the steps of:

initiating an application, supported by an application server within the network, and a corresponding session between a remote host and user equipment via the application server;

requesting, to a gateway support node of the network by the user equipment, establishment of a network bearer service between the user equipment and the remote host;

receiving, by a corresponding policy control function in a policy server, from the application server, filtering data derived from session data received by the application server from the user equipment and remote host during the session, said filtering data being processed by the policy control function to derive corresponding policy control filtering data; and establishing the network bearer service and initializing a gate at the gateway support node according to the policy control filtering, wherein said gate is initialized to filter the packet data flow in the network.

35. The method of claim 34, comprising the additional steps of:

sending, by the application server, an event trigger(s) to the policy server to request a gate opening;

sending, by the policy server, a corresponding gate open command to the gateway support node to open the gate, said gate opening initiating the data flow in the QoS connection; and filtering, by the gate, the data flow in the QoS connection according to the policy control filtering data.

36. The method of claim 35, comprising the additional steps of:

sending, by the application server, an event trigger(s) to the policy server to request a gate closing;

sending, by the policy server, a corresponding gate close command to the gateway support node to close the gate;

closing the gate to end the data flow in response to the gate close command;

terminating the session with the user equipment by the application server; and terminating the network bearer service.

37. The method of claim 34, wherein the application server is a SIP proxy server.

38. A method of filtering and gating data flow in a end-to-end IP QoS connection between a remote host and user equipment in a UMTS network using policy control mechanisms, the method comprising the steps of:

initiating, by one of the remote host and the user equipment, an application, supported by a proxy server, and a corresponding session between the remote host and the user equipment via the proxy server;

requesting, to a gateway support node of the network by the user equipment, establishment of a network bearer service between the user equipment and the remote host, said network bearer service being differentiated by allowing different degrees of QoS;

receiving, by a corresponding policy control function in a policy server, from the proxy server running the application, filtering data derived from session data received by the proxy server from the user equipment and remote host during the session, said filtering data being processed by the policy control function to derive corresponding policy control filtering data;

interrogating, by the gateway support node, the corresponding policy control function in the policy server to determine whether the establishment of the network bearer service is permitted; and if the establishment of the network bearer service is permitted, then establishing a gate at the gateway support node, said gate being initialized with the policy control filtering data received either as a result of the gateway support node's interrogation of the policy control function or as a result of the policy control filtering data being pushed by the policy server to the gateway support node, wherein said gate is initialized to filter the data flow in the end-to-end IP QoS connection.

39. The method of claim 38, comprising the additional steps of:

sending, by the proxy server, an event trigger(s) to the policy server to request a gate opening;

sending, by the policy server, a corresponding gate open command to the gateway support node to open the gate, said gate opening initiating the data flow in the QoS connection; and filtering, by the gate, the data flow in the QoS connection according to the policy control filtering data.

40. The method of claim 39, comprising the additional steps of:

sending, by the proxy server, an event trigger(s) to the policy server to request a gate closing;

sending, by the policy server, a corresponding gate close command to the gateway support node to close the gate;

closing the gate to end the data flow in response to the gate close command;

terminating the session with the user equipment by the application server; and terminating the network bearer service.

41. The method of claim 38, wherein the proxy server is an SIP proxy server.

* * * * *